(12) United States Patent
Suh et al.

(10) Patent No.: US 12,506,278 B2
(45) Date of Patent: Dec. 23, 2025

(54) ELECTRONIC DEVICE WITH ANTENNA MODULES

(71) Applicant: LG ELECTRONICS INC., Seoul (KR)

(72) Inventors: Yusuhk Suh, Seoul (KR); Dongik Lee, Seoul (KR); Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 18/660,877

(22) Filed: May 10, 2024

(65) Prior Publication Data

US 2024/0429622 A1    Dec. 26, 2024

(30) Foreign Application Priority Data

Jun. 23, 2023  (KR) ................. 10-2023-0081107

(51) Int. Cl.
*H01Q 1/22*  (2006.01)
*H01Q 1/48*  (2006.01)
*H01Q 9/04*  (2006.01)
*H01Q 21/06*  (2006.01)

(52) U.S. Cl.
CPC ............. *H01Q 21/065* (2013.01); *H01Q 1/48* (2013.01); *H01Q 9/0414* (2013.01); *H01Q 21/062* (2013.01)

(58) Field of Classification Search
CPC .......... H01Q 1/2283; H01Q 1/52; H01Q 1/24; H01Q 9/0414; H01Q 21/0025; H01Q 21/065; H01Q 21/24–30
See application file for complete search history.

(56) References Cited

U.S. PATENT DOCUMENTS 10,840,583 B2 * 11/2020 Lee ..................... H01Q 21/065
12,149,000 B2 * 11/2024 Park ...................... H01Q 21/28
12,316,006 B2 *  5/2025 Jang .................... H01Q 9/0414

FOREIGN PATENT DOCUMENTS

KR   20-2019-0001741    7/2019
KR   10-2020-0141339   12/2020
KR   10-2022-0136989   10/2022

OTHER PUBLICATIONS

Korean Intellectual Property Office Application No. 10-2023-0081107, Notice of Allowance dated Feb. 19, 2025, 6 pages.

* cited by examiner

*Primary Examiner* — Hasan Islam

(74) *Attorney, Agent, or Firm* — LEE, HONG, DEGERMAN, KANG & WAIMEY

(57) ABSTRACT

An antenna module includes a substrate having a first surface, a second surface, and a periphery between the first and second surfaces, a first array antenna disposed on the first surface of the substrate and forming a beam pattern toward a front area, a second array antenna disposed on a first part of the periphery of the substrate and forming a beam pattern toward a bottom area, and third and fourth array antennas disposed on second and third parts of the periphery of the substrate and forming beam patterns toward side areas.

10 Claims, 14 Drawing Sheets

(a)  (b)

(a)

(b)

(a)

(b)

(a)

(b)

(a)

(b)

(a)

(b)

(a)

(b)

ELECTRONIC DEVICE WITH ANTENNA MODULES

CROSS-REFERENCE TO RELATED APPLICATION

Pursuant to 35 U.S.C. § 119(a), this application claims the benefit of earlier filing date and right of priority to Korean Patent Application No. 10-2023-0081107, filed on Jun. 23, 2023, the contents of which are all hereby incorporated by reference herein in their entireties.

TECHNICAL FIELD

The present disclosure relates to an electronic device, and more particularly, to an electronic device with antenna modules that wirelessly receive data.

BACKGROUND

As image technology changes from analog to digital, development has been made from SD (Standard-Definition) to HD (Hi-Definition) to provide an image closer to a real world. SD supports a resolution of 704×480 and consists of about 350,000 pixels, and HD is divided into HD and Full HD. Between them, Full HD supports a resolution of 1920× 1080 and consists of 2 million pixels to provide a significantly higher quality image compared to SD.

Recent image technology is growing one step further to Ultra High-Definition (UHD) beyond Full HD, and the UHD, which supports high image quality and ultra-high resolution, is spotlighted as a next-generation media environment. The UHD supports 4K (3840×2160) and 8K (7680×4320) resolutions and surround audio of up to 22.2 channels. Compared to the HD, the UHD provides 4 times higher picture quality than the 4K UHD, and the 8K UHD provides 16 times higher image quality than the HD.

In recent years, a wireless display system that wirelessly transmits such a high-resolution image to a display device has emerged.

The wireless display system is a system that transmits and receives A/V data between an A/V transmitting device and an A/V receiving device through a local area network.

The A/V receiving device displays A/V data received from the A/V transmitting device.

An example of the A/V transmitting device may be a transmission box having an antenna module that wirelessly transmits A/V data.

An example of the A/V receiving device may be a display device provided with an antenna module that receives A/V data transmitted from the A/V transmitting device to output the received A/V data.

The display device may include a pair of antenna modules and an IR module located between the pair of antenna modules, and the pair of antenna modules may be disposed to spaced apart from each other on left and right sides thereof.

In the wireless display system, an antenna module of the A/V transmitting device may be located on the left or right side of the display device, and in this case, a pair of antenna modules provided in the display device may receive data transmitted from the antenna module of the A/V transmitting device in a two-stream method, and the display device may output an image.

When the A/V transmitting device is disposed on the left or right side of the display device, one of the pair of antenna modules of the display device cannot receive data because its signal is blocked by the IR module, and the display device operates with one stream.

When operating with one stream, its compression rate must be doubled compared to the case with two streams to transmit and receive data at the same level as in the case of two streams, but when the compression rate is increased, its image quality level may be decreased.

SUMMARY

An aspect of the present disclosure is to provide an electronic device capable of performing wireless communication of A/V data regardless of the location of an A/V transmitting device.

Another aspect of the present disclosure is to perform A/V wireless communication in an optimized manner according to an array antenna disposition structure of an A/V transmitting device and an electronic device.

Still another aspect of the present disclosure is to perform A/V wireless communication in an optimized manner in consideration of the location of an A/V transmitting device and an electronic device, and the polarization characteristics of an array antenna.

Yet still another aspect of the present disclosure is to provide seamless A/V wireless communication even when an obstacle is disposed on a wireless communication path between an A/V transmitting device and an electronic device.

Yet still another aspect of the present disclosure is to implement an antenna module that is capable of transmitting signals over a long distance to a front area of an A/V transmission device and that is also capable of transmitting signals upward.

Yet still another aspect of the present disclosure is to implement an antenna module capable of implementing a wider beam coverage in side areas of an A/V transmission device than that in a front or bottom area.

An antenna module according to the present disclosure includes: a substrate having a first surface, a second surface, and a periphery between the first surface and the second surface; a first array antenna formed on the first surface of the substrate and forming a beam pattern toward a front area; a second array antenna formed on a first part of the periphery of the substrate and forming a beam pattern toward a bottom area; and third and fourth array antennas formed on second and third parts of the periphery of the substrate and forming beam patterns toward side areas.

According to an embodiment, the substrate defines a plurality of side surfaces and is configured such that the first surface of the plurality of side surfaces faces a front side of the antenna module, the second surface faces a rear side of the antenna module, a third surface and a fourth surface of the plurality of side surfaces face left and right sides of the antenna module, and a fifth surface of the plurality of side surfaces faces a bottom side of the antenna module.

According to an embodiment, the antenna module may include a millimeter wave transceiver circuitry that is disposed on the second surface and configured to transmit and receive signals at frequencies between 10 GHz and 400 GHz using at least one of the first to fourth array antennas. A number of elements of the first array antenna forming the beam pattern toward the front area may be greater than a number of elements of the second array antenna forming the beam pattern toward the bottom area. A number of elements of the second array antenna forming the beam pattern toward the bottom area may be greater than a number of elements of the third and fourth array antennas forming the beam patterns toward the side areas.

According to an embodiment, the first array antenna may be disposed on a front side of the substrate. The second array antenna may be disposed on a bottom side of the substrate. The third array antenna and the fourth array antenna may be disposed on one side of the periphery of the substrate and another side opposite to the one side.

According to an embodiment, the first array antenna may include a plurality of patch antennas disposed in one axial direction The second array antenna may include a plurality of dipole antennas disposed in the one axial direction. The third array antenna and the fourth array antenna may include a plurality of monopole antennas disposed in another axis direction.

An electronic device according to an embodiment of the present disclosure may perform wireless communication of A/V data regardless of the location of an A/V transmitting device through first and second antenna structures in which a plurality of array antennas are disposed.

Furthermore, the A/V transmitting device may transmit two streams of data, thereby minimizing video quality deterioration that occurs when increasing a data compression rate.

In addition, since a horizontally polarized antenna and a vertically polarized antenna can be disposed together on one substrate, thereby allowing an antenna module to be compact and providing a high data reception rate.

Moreover, horizontally and vertically polarized signals may be used according to an array antenna disposition structure of the A/V transmitting device and the electronic device, thereby performing A/V wireless communication with reduced mutual interference while increasing a communication capacity.

Besides, horizontally and vertically polarized signals may be used in consideration of the location of the A/V transmitting device and electronic device the polarization characteristics of the array antennas, thereby performing A/V wireless communication with reduced mutual interference while increasing a communication capacity.

In addition, even when an obstacle is disposed on a wireless communication path between the A/V transmitting device and the electronic device, a beamforming direction may be changed and reflected waves may be used, thereby providing seamless A/V wireless communication.

Also, the number of array antennas disposed in a front area of the antenna module of the A/V transmitting device may be greater than the number of antennas in a side area or bottom area. Accordingly, signals can be transmitted over a longer distance in the front area of the antenna module than in the side area or bottom area. Also, an antenna module that has two-dimensional array antennas and is capable of transmitting signals even upward through beamforming can be implemented.

Also, the number of array antennas disposed in side areas of the antenna module of the A/V transmitting device may be greater than the number of antennas in other areas. Accordingly, an antenna module capable of achieving a wider beam coverage in the side areas than that in a front or bottom area can be implemented.

Further scope of applicability of the present disclosure will become apparent from the following detailed description. It should be understood, however, that the detailed description and specific examples, such as the preferred implementation of the present disclosure, are given by way of illustration only, since various modifications and alterations within the spirit and scope of the disclosure will be apparent to those skilled in the art.

DETAILED DESCRIPTION OF THE EMBODIMENTS

A description will now be given in detail of specific embodiments of the present disclosure, together with drawings.

Hereinafter, a description will be given in more detail of embodiments related to the present disclosure, with reference to the accompanying drawings. In general, a suffix such as "module" and "unit" may be used to refer to elements or components. Use of such a suffix herein is merely intended to facilitate description of the specification, and the suffix itself is not intended to give any special meaning or function.

A video/audio (hereinafter referred to as A/V) transmitting device according to an embodiment of the present disclosure, which is, for example, an intelligent device in which a computer support function is added to a broadcast receiving function, may have an easier-to-use interface such as a handwriting input device, a touchscreen, or a spatial remote controller as an Internet function is added thereto while thoroughly performing the broadcast receiving function.

Furthermore, the A/V transmitting device may be connected to the Internet and a computer with the support of a wired or wireless Internet function to perform functions such as e-mailing, web browsing, banking, or gaming. A standard general-purpose OS may be used to perform these various functions.

Accordingly, various applications may be freely added to or deleted from a general-purpose OS kernel, for example, thereby allowing the A/V transmitting device described therein to perform various user-friendly functions.

Figure 1:
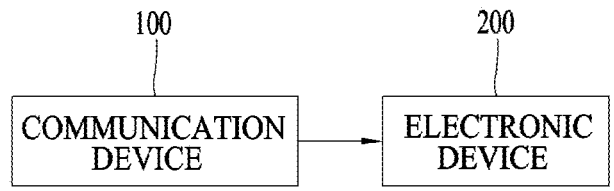
FIG. 1 is a diagram explaining a configuration of a wireless display system according to the present embodiment.

FIG. 1 is a diagram explaining a configuration of a wireless display system according to the present embodiment.

Referring to FIG. 1, a wireless display system 1 according to the present embodiment includes a communication device 100 and an electronic device 200.

The wireless display system 1 may be a system in which the communication device 100 wirelessly transmits A/V data to the electronic device 200 and the electronic device 200 outputs the A/V data.

The communication device 100 may be a device capable of encoding video and audio and wirelessly transmitting the encoded video and audio content.

An example of the communication device 100 may be an all-in-one (AIO) box capable of transmitting data, and may be, for example, a set-top box.

Another example of the communication device 100 may be connected to an external device such as a set-top box or a USB memory. The communication device 100 may transmit a video signal or an audio signal received from an external device connected thereto to the electronic device 200.

The electronic device 200 may be a display device capable of wirelessly receiving the encoded video and audio, and decoding the received video and audio.

The communication device 100 and the electronic device 200 may constitute a video wall display system.

In a video wall, a display having a thin bezel plays an important role in the visualization of video content. In order to efficiently implement a thin bezel, it is efficient to provide only components that can play a minimal role in the display, and to perform circuits or components for major functions in a separate device.

The communication device 100 may determine a type of video content and determine a compression rate of the video content based on the determined type. The compression rate of the video content may be defined as a ratio between a size of video data before encoding and a size of video data after encoding.

The type of video content may include a still image type, a general video type, and a game video type.

The communication device 100 may compress the video content according to the determined compression rate, and wirelessly transmit the compressed video content to the electronic device 200.

The electronic device 200, which may be, for example, a display device, may restore the compressed video content received from the communication device 100, and display the restored video content on a display.

Figure 2:
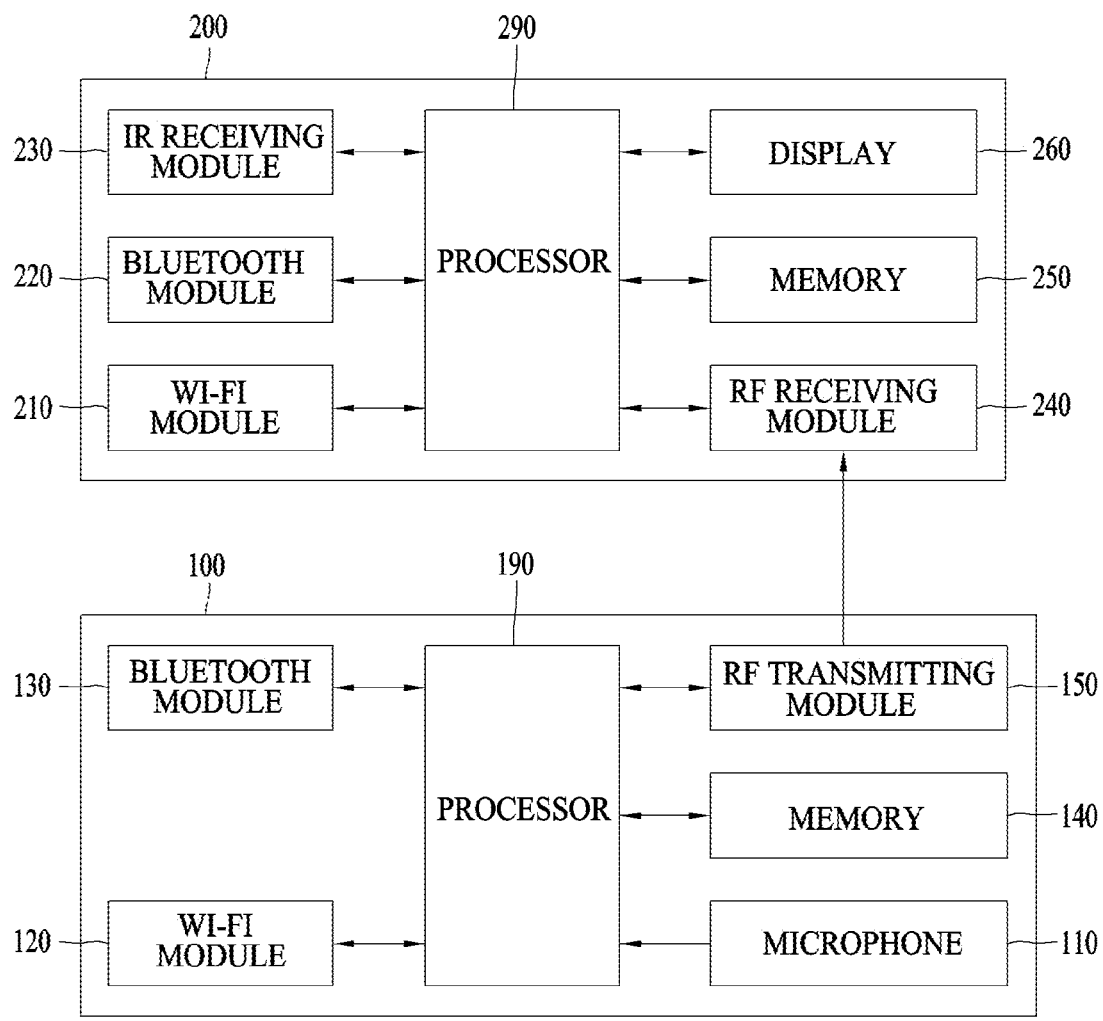
FIG. 2 is a block diagram explaining a detailed configurations of a communication device 100 and an electronic device 200.

FIG. 2 is a block diagram explaining a detailed configurations of a communication device 100 and an electronic device 200.

Referring to FIG. 2, the communication device 100 may include a microphone 110, a Wi-Fi module 120, a Bluetooth module 130, a memory 140, an RF transmitting module 150, and a processor 190.

The microphone 110 may receive an audio signal and transfer the audio signal to the processor 190.

The microphone 110 may receive a voice uttered by a user.

The Wi-Fi module 120 may perform wireless communication through the Wi-Fi standard.

The Wi-Fi module 120 may perform wireless communication with an external device or the electronic device 200 through the Wi-Fi standard.

The Bluetooth module 130 may perform wireless communication through the Bluetooth Low Energy (BLE) standard.

The Bluetooth module 130 may perform wireless communication with an external device such as a remote controller or the electronic device 200 through the Bluetooth Low Energy (BLE) standard.

The memory 140 may store a program for signal processing and control, and may store signal-processed video, audio, or data signals.

The memory 140 may perform a function for temporarily storing video, audio, or data signals received from the outside, and may store information on a predetermined image through a channel storage function.

The RF transmitting module 150 may transmit an A/V signal to the RF receiving module 240 of the electronic device 200 through Radio Frequency (RF) communication.

The RF transmitting module 150 may transmit an A/V signal compressed in a digital form to the RF receiving module 240.

The RF transmitting module 150 may transmit the A/V signal to the RF receiving module 240 through one or more channels.

The processor 190 may control an overall operation of the communication device 100.

The processor 190 may be configured in the form of a system-on-chip (SoC).

The processors 190 may be provided in plurality.

The processor 190 may compress a video signal or an audio signal received from the outside, and transfer the compressed signal to the RF transmitting module 150.

The processor 190 may include an encoder for compressing a video signal or an audio signal.

The processor 190 may be referred to as a main SoC.

The processor 190 may have one or more interfaces for connection with external devices. For example, the processor 190 may have one or more HDMI ports, and one or more USB ports.

The processor 190 may include a tuner that receives broadcast signals.

The electronic device 200 may include a Wi-Fi module 210, a Bluetooth module 220, an IR module 230, an RF receiving module 240, a memory 250, a display panel 260, and a processor 290.

The Wi-Fi module 210 may perform wireless communication through the Wi-Fi standard.

The Wi-Fi module 120 may perform wireless communication with an external device or the communication device 100 through the Wi-Fi standard.

The Bluetooth module 220 may perform wireless communication through the Bluetooth Low Energy (BLE) standard.

The Bluetooth module 220 may perform wireless communication with an external device such as a remote controller or the A/V transmitting device 200 through the Bluetooth Low Energy (BLE) standard.

The IR module 230 may receive a signal from a remote controller (not shown) through infrared (IR) communication.

The RF receiving module 240 may receive an A/V signal from the RF transmitting module 150.

The RF receiving module 240 may include a plurality of antennas. The RF receiving module 240 may be disposed below the display panel 260.

An example of the RF receiving module 240 may include a first antenna module and a second antenna module. Each of the first antenna module and the second antenna module may include a plurality of antennas.

Another example of the RF receiving module 240 may include one antenna module, and the antenna module may include a plurality of antennas.

The RF receiving module 240 may receive an A/V signal compressed in a digital form from the RF transmitting module 150, and transfer the received A/V signal to the processor 290.

The memory 250 may store a program for signal processing and control, and may store signal-processed video, audio, or data signals.

The display panel 260 may be a display panel 260 capable of displaying a video signal received from the processor 290. An example of the display panel 260 may be an LED panel.

The display panel 260 may display a video signal according to the driving of a timing controller (not shown).

The processor 290 may control an overall operation of the electronic device 200.

The processor 290 may restore the compressed A/V signal received by the RF receiving module 240. To this end, the processor 290 may include a decoder.

Meanwhile, the antenna module according to the present disclosure may be disposed in a vertical disposition structure or a horizontal disposition structure. In this regard, FIG. 3 shows a disposition structure of an antenna module disposed in an electronic device according to embodiments.

Figure 3:
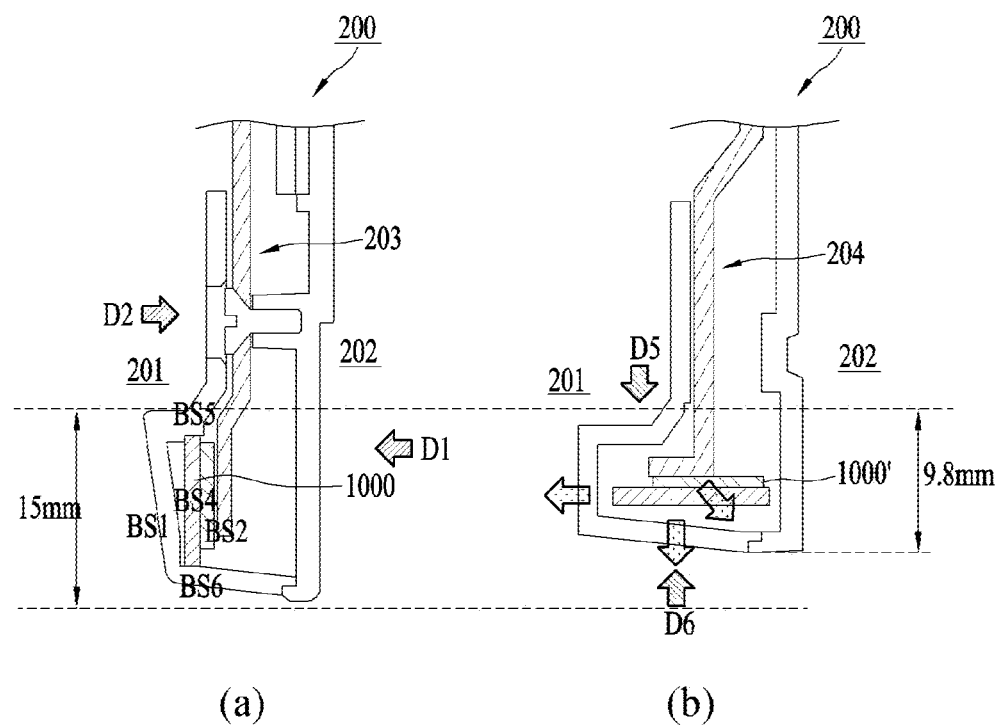
FIG. 3 is a diagram illustrating a process of recognizing an absence of a viewer and recognizing a distance between an A/V transmitting device and an A/V receiving device in accordance with an embodiment of the present disclosure.

Referring to (a) of FIG. 3, an antenna structure 1000 may be coupled to an end of a heat dissipation plate 203 disposed in a space between the first cover 201 and the second cover 202. The first cover 201 and the second cover 202 may correspond to a front cover and a rear cover, respectively. A length of a lower end of the first cover 201 to which the antenna structure 1000 is coupled may be implemented as a predetermined first length (e.g., 15 mm) or less. Upper and lower ends of the antenna structure 1000 may be coupled to upper and lower grooves of the first cover 201 to allow the antenna structure 1000 to be vertically disposed.

An end of the heat dissipation plate 203 and the antenna structure 1000 may be disposed in a vertical structure with respect to a horizontal plane. The end of the heat dissipation plate 203 and the antenna structure 1000 may be disposed in parallel with respect to the Y-axis, which is a vertical axis. To this end, the heat dissipation plate 203 may be coupled to the first and second covers 201, 202 and the antenna structure 1000 through an assembly structure such as a screw or a separate compression structure on front and rear surfaces of the heat dissipation plate 203. The assembly structure or the compression structure may be assembled or compressed in a first direction D1, which is a front direction, or in a second direction D2, which is a rear direction.

The antenna structure 1000 may include a plurality of side surfaces BS1 to BS6. A first surface BS1 of the plurality of side surfaces may be configured to face the front direction D1 of the electronic device 200, and a second surface BS2 of the plurality of side surfaces to face the rear direction D2 of the electronic device 200. A third surface (not shown) of the plurality of side surfaces may be configured to face a left direction of the electronic device 200, and a fourth surface BS4 of the plurality of side surfaces to face a right direction of the electronic device 200. A fifth surface BS5 of the plurality of side surfaces may be configured to face a bottom direction D3 of the electronic device 200.

Referring to FIG. 3(b), an antenna structure 1000 may be coupled to an end of a heat sink 204 disposed in a space between a first cover 201 and a second cover 202. A length of a lower end of the first cover 201 to which the antenna module 300' is coupled may be implemented as a predetermined second length (e.g., 9.8 mm) or less. One side end and a rear surface of the antenna structure 1000' may be coupled to the side region and a rear surface of the first cover 201 to allow the antenna structure 1000' to be disposed parallel to a horizontal plane. The assembly structure or the compression structure may be assembled or compressed in a fifth direction D5, which is a top direction, or in a sixth direction D6, which is a bottom direction.

An end of the heat dissipation plate 204 and the antenna structure 1000 may be disposed in a horizontal structure so as to correspond to a horizontal plane. The end of the heat dissipation plate 204 and the antenna structure 1000' may be disposed in parallel with respect to the X-axis, which is a horizontal axis. To this end, the heat dissipation plate 204 may be coupled to the first cover 201 and the antenna structure 1000' through an assembly structure such as a screw or a separate compression structure on front and rear surfaces of the heat dissipation plate 204. The assembly structure or the compression structure may be assembled or compressed in a first direction D1, which is a bottom direction, or in a second direction D2, which is a top direction.

Meanwhile, an antenna module disposed in an electronic device according to the present disclosure will be described. In this regard, FIG. 4 shows a structural view in which an electronic device provided with a display performs AV wireless communication with other communication devices that may be disposed in various locations.

Figure 4:
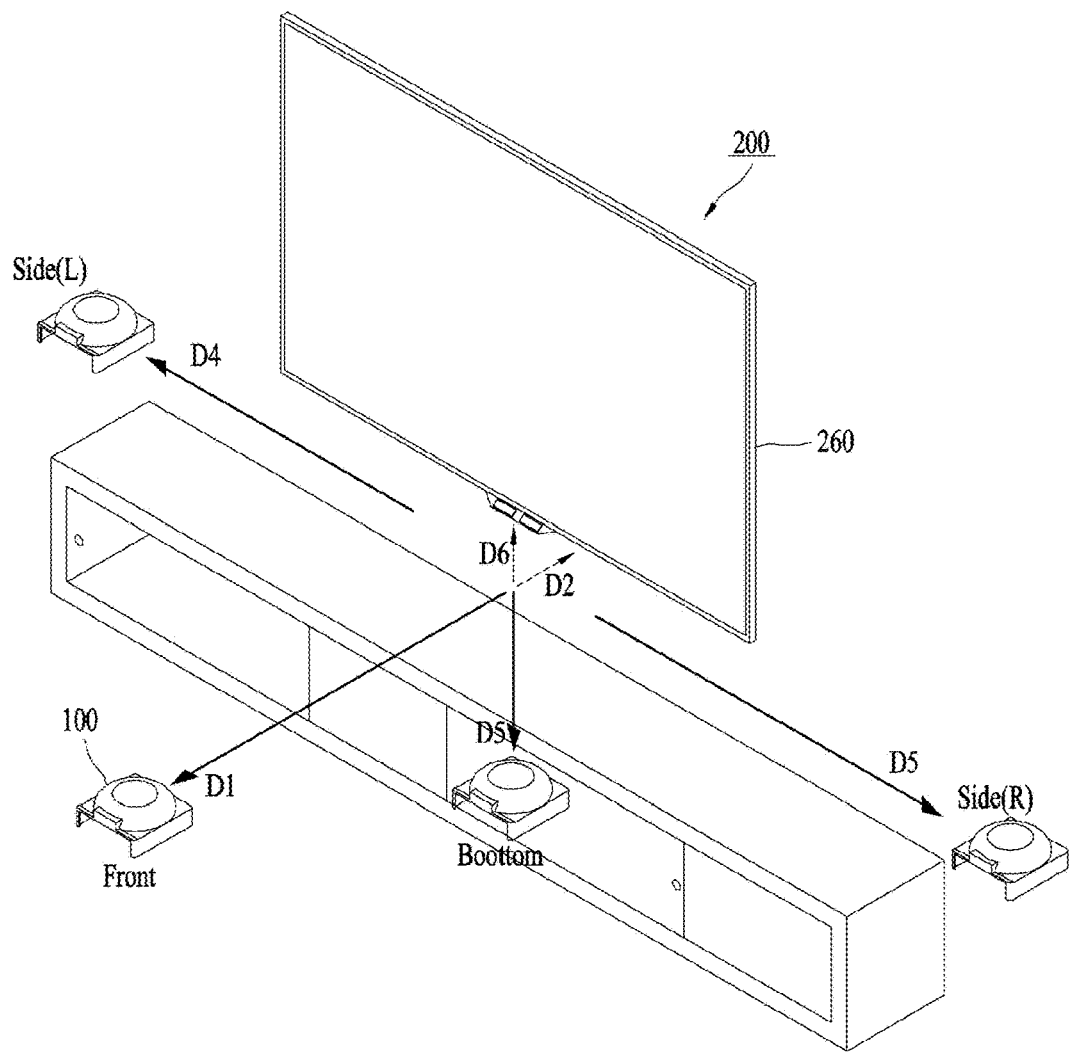
FIG. 4 is a structural view in which an electronic device provided with a display performs AV wireless communication with other communication devices that may be disposed in various locations.

Referring to FIG. 4, the communication device 100 may be disposed in a front direction, a bottom direction, one side direction, or the other side direction of the electronic device 200. The communication device 100 may be an AV transmitting device that transmits AV content to the electronic device 200. The communication device 100 may be a set-top box, but is not limited thereto. The electronic device 200 may be an AV receiving device that receives AV content from the communication device 100. The electronic device 200 may be a display device, but is not limited thereto. The electronic device 200 receives data from the communication device 100, but may also transmit data to the communication device 100.

The communication device 100 may be disposed in the first direction D1 that is the front direction of the electronic device 200. In this regard, the electronic device 200 may transmit or receive a wireless signal in the first direction D1, which is the front direction. A rear direction of the electronic device 200 may be defined as the second direction D2.

The communication device 100 may be disposed in the third direction D3, which is the left direction of the electronic device 200, or in the fourth direction D4, which is the right direction thereof. In this regard, the electronic device 200 may transmit or receive a wireless signal in the fourth direction D4 or the fifth direction D5, which is the left direction.

The communication device 100 may be disposed in the fifth direction D5 that is the bottom direction of the electronic device 200. In this regard, the electronic device 200 may transmit or receive a radio signal in the fifth direction D5, which is the bottom direction. The top direction of the electronic device 200 may be defined as the sixth direction D6.

Meanwhile, a wireless link on a line-of-sight (LOS) path may not be formed due to an obstacle between the communication device 100 and the electronic device 200. In this regard, the electronic device 200 may transmit and receive a wireless signal through a wireless link on a non-LOS path such as a reflection path. The communication device 100 may transmit or receive a wireless signal in a ceiling direction, which is an upper front direction. Communication is enabled between the communication device 100 and the electronic device 200 through a wireless signal reflected from a ceiling or wall surface.

Meanwhile, an electronic device according to the present disclosure may include a plurality of antenna modules (structures) to perform wireless communication with a communication device through the plurality of antenna modules (structures). In this regard, FIG. 5 shows a structure of an antenna module below an electronic device.

Figure 5:
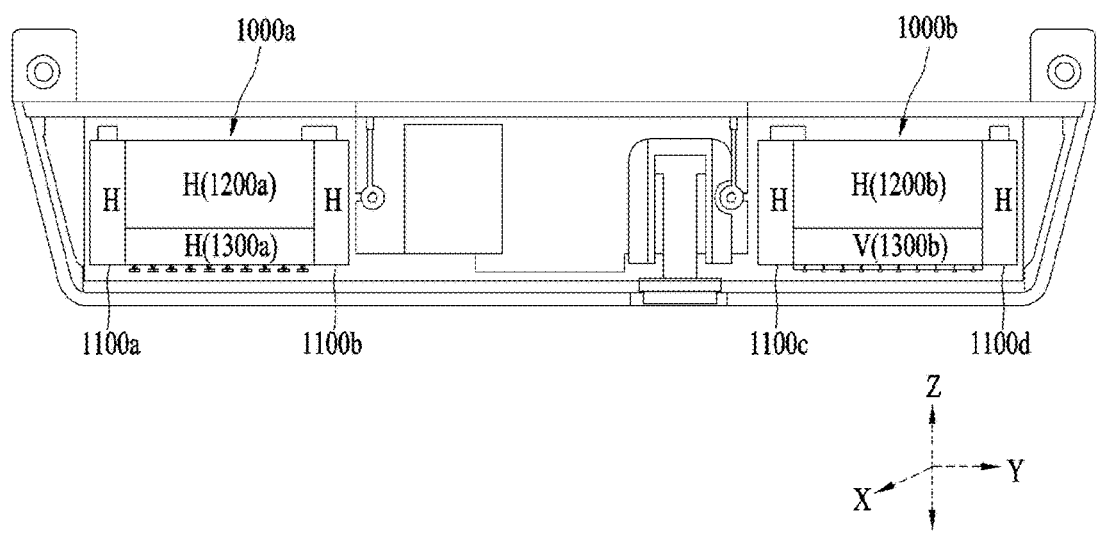
FIG. 5 shows a structure of an antenna module below an electronic device.

Referring to FIGS. 3 to 5, the electronic device 200 may include a display panel 260 and an antenna module 1000a. The first and second antenna structures 1000a, 1000b may be disposed around the display panel 260. The first and second antenna structures 1000a, 1000b of FIG. 5 may correspond to the third and fourth antenna structures 1000a, 1000b of FIGS. 7A and 7B, respectively.

The first antenna structure 1000a may be disposed in one side region of the electronic device 200. The second antenna structure 1000b may be disposed in the other side region of the electronic device 200.

The first antenna structure 1000a may include a first array antenna 1200a and a second array antenna 1300a. The first array antenna 1200a operates as a horizontally polarized antenna that receives or transmit a signal in a front direction. The second array antenna 1300a operates as a horizontally polarized antenna that receives or transmits a signal in a bottom direction. The first array antenna 1200a may radiate a polarized signal that is polarized in the Y-axis direction to travel in the X-axis direction. The second array antenna 1300a may radiate a polarized signal that is polarized in the Y-axis direction to travel in a lower Z-axis direction.

The first antenna structure 1000a may further include a third array antenna 1100a and a fourth array antenna 1100b. The third array antenna 1100a operates as a horizontally polarized antenna that receives or transmits a signal in a left direction. The fourth array antenna 1100b operates as a horizontally polarized antenna that receives or transmits a signal in a right direction. The third array antenna 1100a may radiate a polarized signal that is polarized in the X-axis direction to travel in a left Y-axis direction. The fourth array antenna 1100b may radiate a polarized signal that is polarized in the X-axis direction to travel in a right Y-axis direction.

The second antenna structure 1000b may include a fifth array antenna 1200b and a sixth array antenna 1300b. The fifth array antenna 1200b may operate as a horizontally polarized antenna that receives or transmit a signal in a front direction. The sixth array antenna 1300b may operate as a vertically polarized antenna that receives or transmits a signal in a bottom direction. The fifth array antenna 1200b may radiate a polarized signal that is polarized in the Y-axis direction to travel in the X-axis direction. The sixth array antenna 1300b may radiate a polarized signal that is polarized in the X-axis direction to travel in a lower Z-axis direction.

The second antenna structure 1000b may further include a seventh array antenna 1100c and an eighth array antenna 1100d. The seventh array antenna 1100c and the eighth array antenna 1100d operate as horizontally polarized antennas. The seventh array antenna 1100c operates as a horizontally polarized antenna that receives or transmits a signal in a left direction. The eighth array antenna 1100d operates as a horizontally polarized antenna that receives or transmits a signal in a right direction. The seventh array antenna 1100c may radiate a polarized signal that is polarized in the X-axis direction to travel in a left Y-axis direction. The eighth array antenna 1100d may radiate a polarized signal that is polarized in the X-axis direction to travel in a right Y-axis direction.

Figure 6:
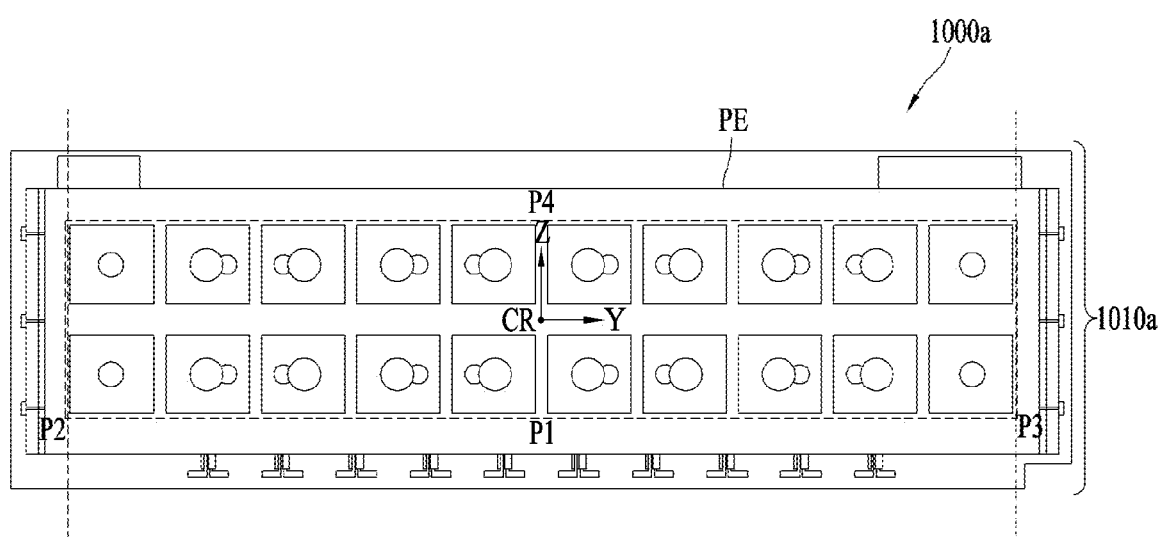
FIGS. 6 and 7 are front and sectional views illustrating a substrate having an antenna module that may be disposed on one side of an electronic device.
Figure 6:
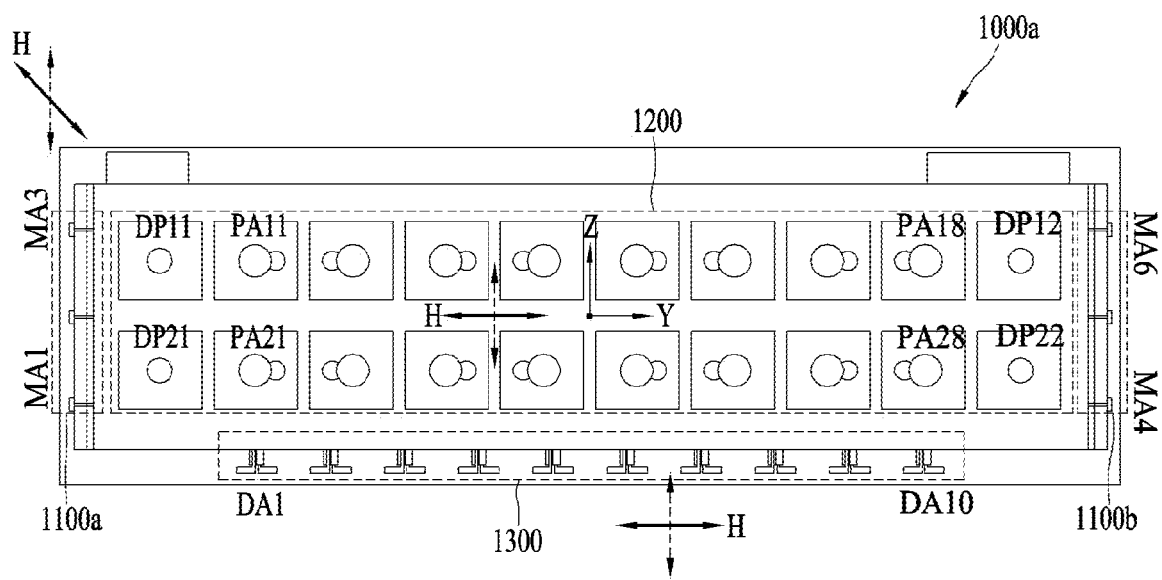
Figure 7:
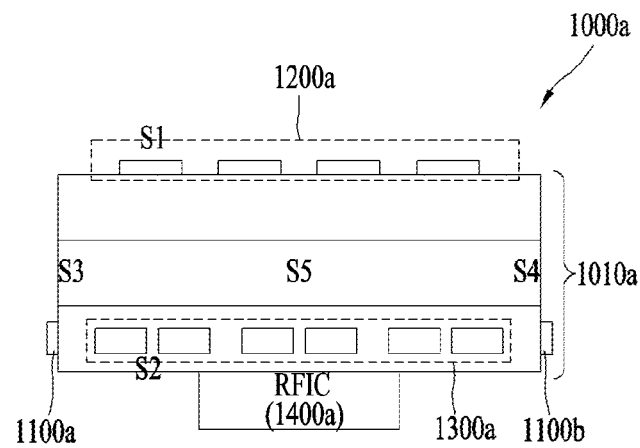
Figure 7:
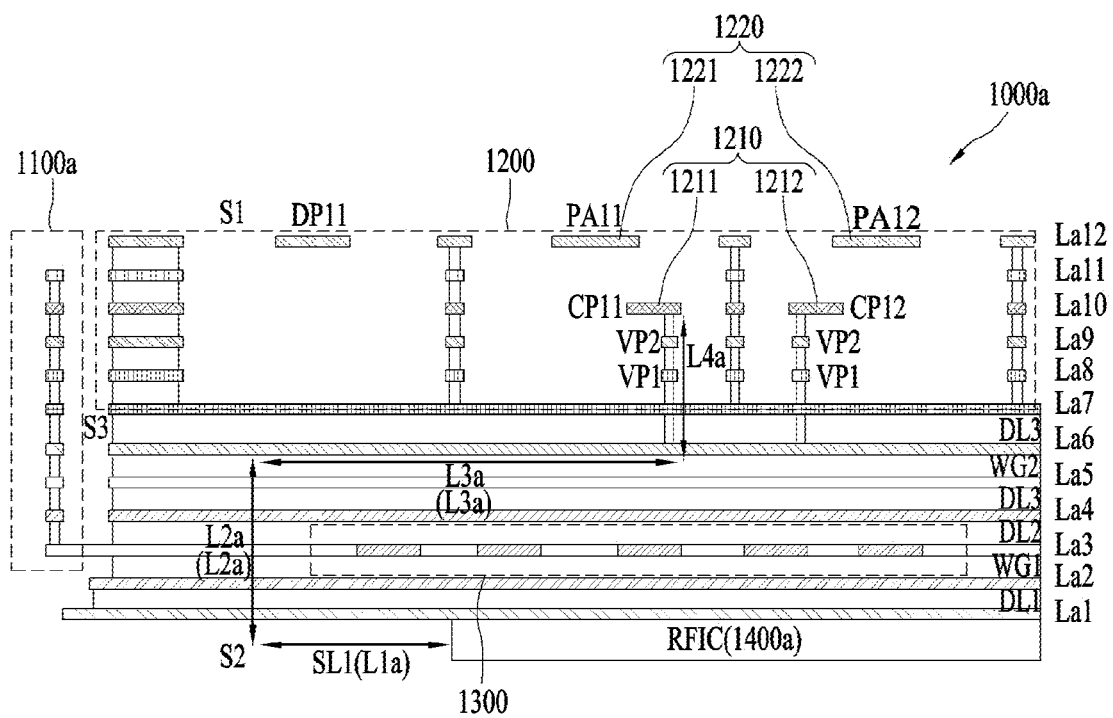
Figure 8:
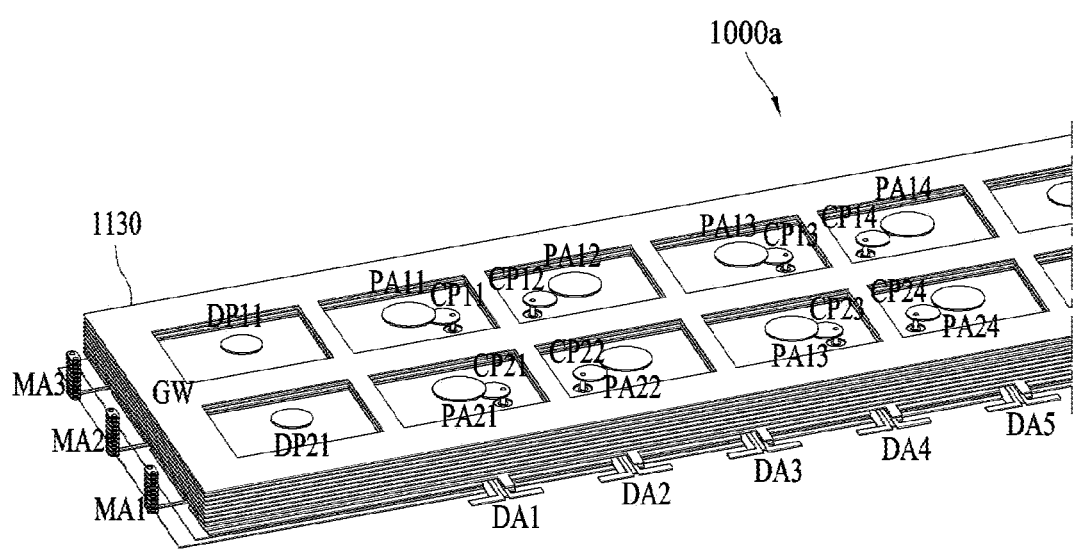
FIG. 8 shows a perspective view of the antenna module of FIG. 6 and an enlarged view of a partial area.
Figure 8:
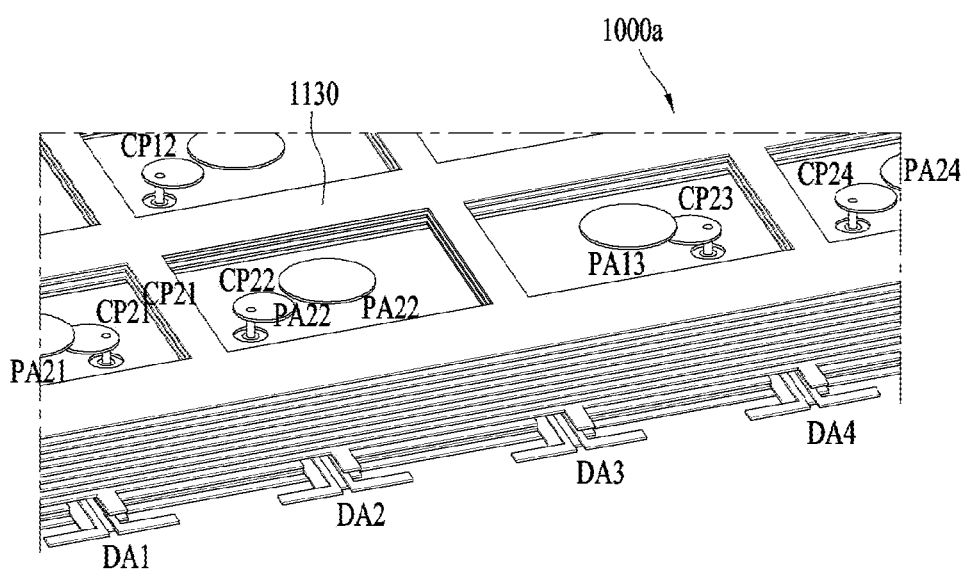

Hereinafter, an antenna module disposed in an electronic device according to the present disclosure will be described. In this regard, FIGS. 6 and 7 are front and sectional views illustrating a substrate having an antenna module that may be disposed on one side of an electronic device. FIG. 8 shows a perspective view of the antenna module of FIG. 6 and an enlarged view of a partial area.

(a) of FIG. 6 shows the substrate with the antenna module 1000a for each area. A substrate 1010a may include a central region CR and a periphery PE surrounding the central region CR. The periphery PE of the substrate 1010a may include a first part P1 to a fourth part P4. The first part P1 constitutes a bottom area of the substrate 1010a, and the second part P2 constitutes one side area of the substrate 1010a. The third part P3 constitutes another side area of the substrate 1010a, and the fourth part P4 constitutes a top area of the substrate 1010a.

Referring to FIGS. 5 and 6, the antenna module 1000a may include a substrate 1010a, a first array antenna 1200a, a second array antenna 1300a, a third array antenna 1100a, and a fourth array antenna 1100b. Since the third and fourth array antennas 1100a and 1100b are disposed on the one side area and the another side area of the substrate 1010a, they may be referred to as first and second side array antennas.

(a) of FIG. 7 is a sectional view of the antenna module 1000a, and (b) of FIG. 7 is a sectional view of the substrate 1010a shown for each layer. (a) of FIG. 8 shows a perspective view of one side area based on the center of the antenna module 1000a. (b) of FIG. 8 is an enlarged view illustrating an area where some of dipole antennas DA1 to DA4 constituting the second array antenna 1300a of the antenna module are disposed.

Referring to FIGS. 6 to 8, a ground wall (GW) 1130 is formed on the periphery PE of the substrate 1010a and includes vias connecting a plurality of layers. The ground wall (GW) 1130 is disposed in one axial direction and another axial direction between patch antennas PA11 to PA28 to surround each of the patch antennas PA11 to PA28.

The ground wall (GW) 1130 operates as a ground for radiation of the patch antennas PA11 to PA28 and may be referred to as a ground cavity wall. The ground wall (GW) 1130 suppresses side surface radiation and rear surface radiation of the patch antennas PA11 to PA28 having a front surface radiation structure, and functions as a reflector to the front side. In addition, the ground wall (GW) 1130 suppresses rear surface radiation in another side direction of monopole antennas MA1 to MA6 having a side surface radiation structure, and functions as a reflector toward the front side in one side direction. In addition, the ground wall 1130 (GW) suppresses rear surface radiation in a top direction of dipole antennas DA1 to DA10 having a bottom radiation structure, and functions as a reflector in a bottom direction.

The first array antenna 1200*a* may further include dummy pads DP11 to DP22 disposed on one side and another side of the patch antennas PA11 to PA28. Among the dummy pads DP11 to DP22, the first dummy pad DP11 is disposed between the first patch antenna PA11 in a first row and the second part P2. The second dummy pad DP12 is disposed between the second patch antenna PA12 in the first row and the second part P2. Among the dummy pads DP11 to DP22, the third dummy pad DP21 is disposed between the first patch antenna PA21 in a second row and the third part P3. The fourth dummy pad DP22 is disposed between the second patch antenna PA22 in the second row and the third part P3.

The ground wall (GW) 1130 may be formed to surround the dummy pads DP11 to DP22. First patch elements 1210 of the plurality of patch antennas PA11 to PA28 may be connected to feed lines. The dummy pads DP11 to DP22 are not connected to the feed lines. Second patch elements 1220 of the plurality of patch antennas PA11 to PA28 are not connected to the feed lines.

A distance between the ground wall (GW) 1130 and the dummy pads DP11 to DP22, respective sizes thereof, and the like may be implemented within a predetermined range based on a half wavelength of an operating frequency of 60 GHz. Layer positions and sizes of conductive plates CP11 to CP28 corresponding to coupling pads and overlap areas with the patch antennas PA11 to PA28 may be designed in consideration of radiation characteristics and disposition characteristics.

Referring to FIGS. 3 and 6 to 8, the antenna module 1000*a* may further include a millimeter wave transceiver circuitry 1400*a*.

The substrate 1010*a* may include a first surface S1, a second surface S2, a periphery PE, and a central region CR. The periphery PE may be formed between the first surface S1 and the second surface S2. The first surface S1 may be opposite to the second surface S2. The substrate 1010*a* may be implemented as a multi-layer substrate. For example, the substrate 1010*a* may be implemented as a 12-layer substrate, but is not limited thereto, and may vary depending on applications. The first surface S1 of the substrate 1010*a* may correspond to a surface of a twelfth layer La12.

The substrate 1010*a* may have a plurality of side surfaces. Among the plurality of side surfaces, the first surface S1 may be disposed to face a front direction of the antenna module 1000*a*, and the second surface S2 may be disposed to face a rear direction of the antenna module 1000*a*. Among the plurality of side surfaces, the third and fourth surfaces S3 and S4 may be disposed to face left and right directions, respectively. Among the plurality of side surfaces, a fifth surface S5 may be configured to face a bottom direction of the antenna module.

The third array antenna 1100*a* and the fourth array antenna 1100*b* may be disposed on the second part P2 and the third part P3 of the periphery PE of the substrate 1010*a*. The third array antenna 1100*a* and the fourth array antenna 1100*b* may form beam patterns to side areas of the electronic device. The third array antenna 1100*a* and the fourth array antenna 1100*b* may radiate horizontally polarized signals to the side areas of the electronic device.

The third array antenna 1100*a* may include a plurality of monopole antennas MA1 to MA3 disposed on the second part P2 of the periphery PE of the substrate 1010*a*. The fourth array antenna 1100*b* may include the plurality of monopole antennas MA4 to MA6 disposed on the third part P3 of the periphery PE of the substrate 1010*a*. The third array antenna 1100*a* and the fourth array antenna 1100*b* may be implemented with three antenna elements on one side and another side of the periphery PE of the substrate 1010*a*, respectively. The third array antenna 1100*a* may be implemented as a 1×3 array antenna on one side of the substrate 1010*a*, but is not limited thereto. The fourth array antenna 1100*b* may be implemented as a 1×3 array antenna on another side of the substrate 1010*a*, but is not limited thereto.

The first array antenna 1200*a* may be disposed on the first surface S1 of the substrate 1010*a*. The first array antenna 1200*a* may form a beam pattern toward the front area of the electronic device. The first array antenna 1200*a* may radiate a horizontally polarized signal to the front area of the electronic device. The first array antenna 1200*a* may be implemented as 16 antenna elements on the center region CR of the substrate 1010*a*.

The first array antenna 1200*a* may include the plurality of patch antennas PA11 to PA18 and PA21 to PA28 disposed on the first surface S1 of the substrate 1010*a*. The dummy pads DP11 and DP21 may be disposed on one side of the patch antennas PA11 and P21 to suppress side surface radiation. The dummy pads DP12 and DP22 may be disposed on another side of the patch antennas PA11 and P21 to suppress side surface radiation. The first array antenna 1200*a* may be implemented as 16 2×8 array antennas on the center region CR of the substrate 1010*a*, but is not limited thereto.

Each patch antenna of the first array antenna 1200*a* may include first patch elements 1210 and second patch elements 1220. The second patch elements 1220 may be stacked in a direction perpendicular to the first patch elements 1210 such that signals of the first patch elements 1210 are coupled. The center of the second patch element 1220 may be offset from the center of the first patch element 1210 in one axial direction.

A second gap between adjacent second patch elements 1221 and 1222 may be larger than a first gap between adjacent first patch elements 1211 and 1212. To this end, the second patch element 1221 in a first column may be disposed to be offset in the left direction with respect to the first patch element 1211 in the first column. Meanwhile, the second patch elements 1222 in a second column may be disposed to be offset in the right direction with respect to the first patch element 1212 in the second column. A current flow direction of a signal applied to the first patch element 1211 in the first column is the left direction, and a current flow direction of a signal applied to the first patch element 1212 in the second column is the right direction. The current flow directions of the signals applied to the first patch elements 1211 and 1212 in the first and second columns are opposite to each other. Accordingly, a phase difference of the signals applied to the first patch elements 1211 and 1212 in the first and second columns is supposed to be 180 degrees so that the current flow directions can be the same. To this end, the RFIC 1400*a* may control a phase shifter such that the phase difference between the signals applied to the first patch elements 1211 and 1212 in the first and second columns is 180 degrees.

The second array antenna 1300*a* may be disposed on the first part P1 of the periphery PE of the substrate 1010*a*. The second array antenna 1300*a* may form a beam pattern toward the bottom area of the electronic device. The second array antenna 1300*a* may radiate a horizontally polarized signal to the bottom area of the electronic device.

The second array antenna 1300*a* may include a plurality of dipole antennas DA1 to DA10 disposed on the first part P1 of the periphery PE of the substrate 1010*a*. The second array antenna 1300*a* may be implemented as 10 antenna elements on the bottom side of the periphery PE of the substrate 1010a. The second array antenna 1300a may be implemented as 10 1×10 array antennas on the bottom side of the periphery PE of the substrate 1010a, but is not limited thereto.

The plurality of array antennas may be disposed in an X-axial direction (one axial direction) and a Y-axial direction (another axial direction) of the substrate 1010a. The third array antenna 1100a and the fourth array antenna 1100b may include a plurality of monopole antennas MA1 to MA3 and MA4 to MA6 disposed in the another axial direction. The first array antenna 1200a may include a plurality of patch antennas PA11 to PA18 and PA21 to PA28 disposed in the one axial direction. The second array antenna 1300a may include a plurality of dipole antennas DA1 to DA10 disposed in the one axial direction.

The millimeter wave transceiver circuitry 1400a may be disposed on the second surface S2. The millimeter wave transceiver circuitry 1400a may be configured to transmit and receive signals at frequencies between 10 GHz and 400 GHz using at least one of the first array antenna 1200a, the second array antenna 1300a, and the third and fourth array antennas 1100a and 1100b. The millimeter wave transceiver circuitry 1400a may be configured to transmit and receive signals at frequencies between 10 GHz and 400 GHz using at least one of the plurality of monopole antennas MA1 to MA6, the plurality of patch antennas PA11 to PA18 and PA21 to PA28, and the plurality of dipole antennas DA1 to DA10. The millimeter wave transceiver circuitry 1400a may be referred to as a radio frequency integrated chip (RFIC).

The number of elements of the first array antenna 1200a forming the beam pattern toward the front area may be set to be greater than the number of elements of the second array antenna 1300a forming the beam pattern toward the bottom area. The number of elements of the second array antenna 1300a forming the beam pattern toward the bottom area may be set to be greater than the number of elements of the third and fourth array antennas 1100a and 1100b forming the beam pattern toward the side areas.

In this regard, 16 pins among 32 pins of the RFIC 1400a may be connected to the first array antenna 1200a forming the beam pattern toward the front area. Ten pins of the 32 pins of the RFIC 1400a may be connected to the second array antenna 1300a forming the beam pattern toward the bottom area. 6 pins of the 32 pins of the RFIC 1400a may be connected to the third and fourth array antennas 1100a and 1100b forming the beam pattern toward the side areas.

In this regard, the first array antenna 1200a has the largest number of elements, so it can transmit signals over a long distance to the front area of the electronic device, but has a narrow beam coverage. The narrow beam coverage can be supplemented by changing a beamforming direction to a horizontal direction of the front area. Accordingly, the number of elements of the first array antenna 1200a may be plural in one axial direction and two in another axial direction. For example, the second array antenna 1300a may be implemented as 2×8 array antennas. A beam may be formed upward by a predetermined angle from the front direction through a phase difference between signals applied between the antenna elements in the first row and the antenna elements in the second row.

The electronic device needs to perform AV wireless communication with another electronic device disposed in a bottom area of the electronic device. For the AV wireless communication, beamforming may be implemented in units of narrow beam coverage in a horizontal direction, which is the one axial direction, in the bottom area of the electronic device. Meanwhile, it is not necessary to transmit a signal to a bottom area of the electronic device over a long distance. Accordingly, the number of elements of the second array antenna 1300a may be plural in the one axial direction and one in the another axial direction. For example, the second array antenna 1300a may be implemented as 1×8, 1×10, or 1×12 array antennas.

Signals may be transferred to the side areas of the electronic device in an indoor radio environment where the electronic device is disposed. It is more important to implement a wide beam coverage for the side areas of the electronic device even without beamforming, than to implement a signal transmission over a long distance. In this regard, since the number of elements of the third and fourth array antennas 1100a and 1100b is the smallest, a wide beam coverage to the side areas of the electronic device can be achieved. Accordingly, the number of elements of the third and fourth array antennas 1100a and 1100b may be plural in the one axial direction and one in the another axial direction. For example, the third and fourth array antennas 1100a and 1100b may be implemented as 1×3 array antennas on one side and another side.

Figure 9A:
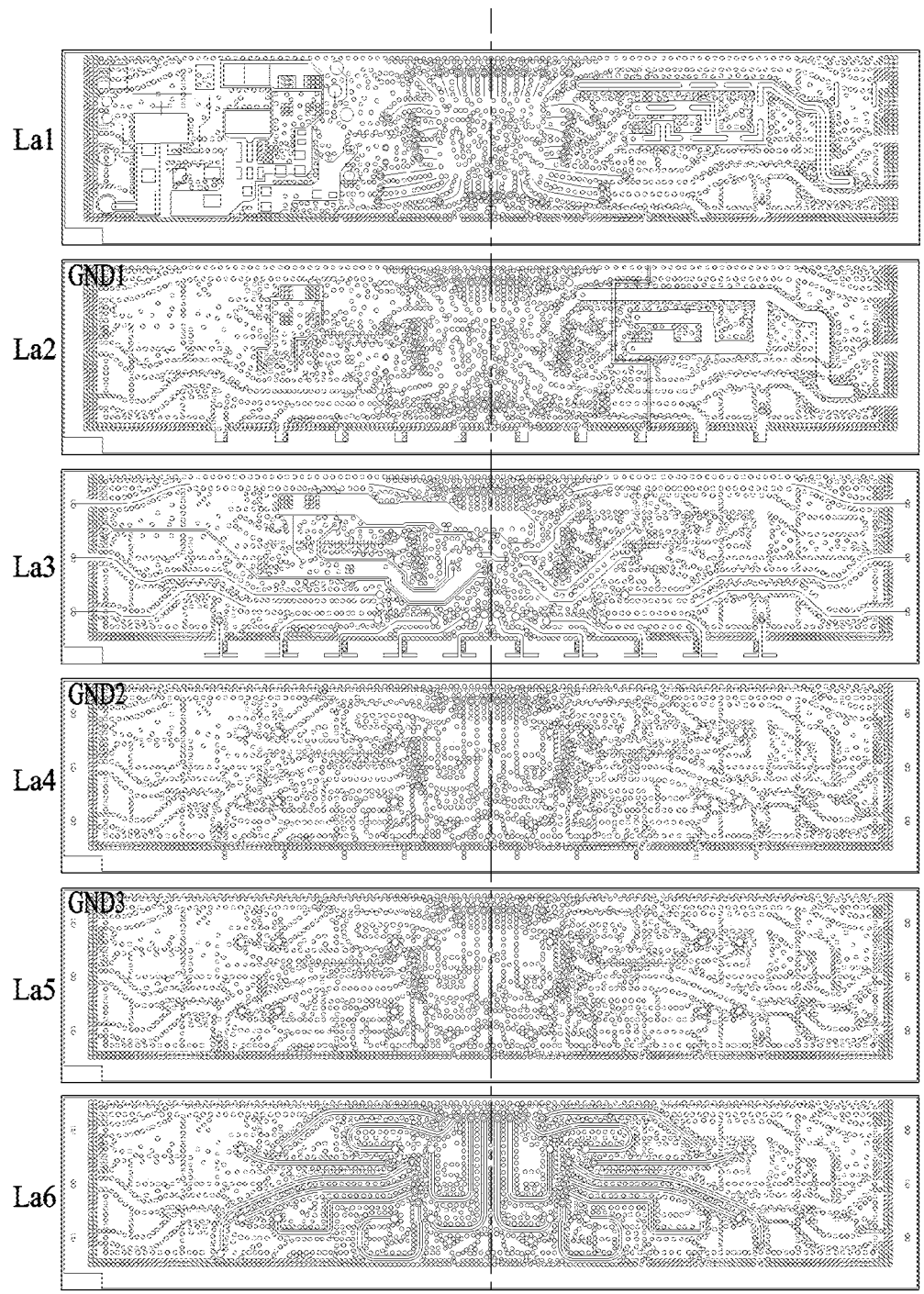
FIGS. 9A and 9B are front views illustrating the antenna module of FIG. 7 for each layer.
Figure 9B:
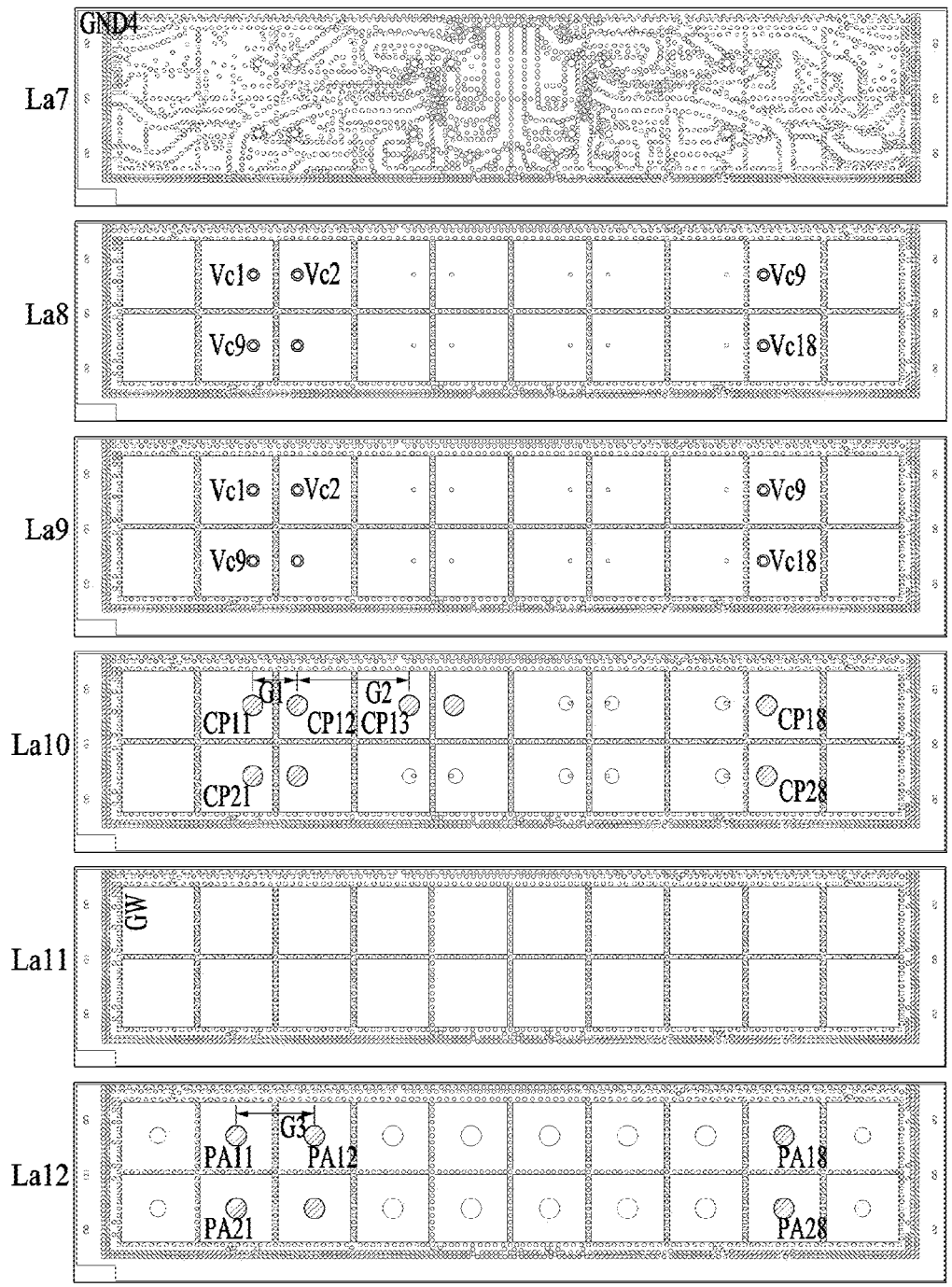
Figure 9C:
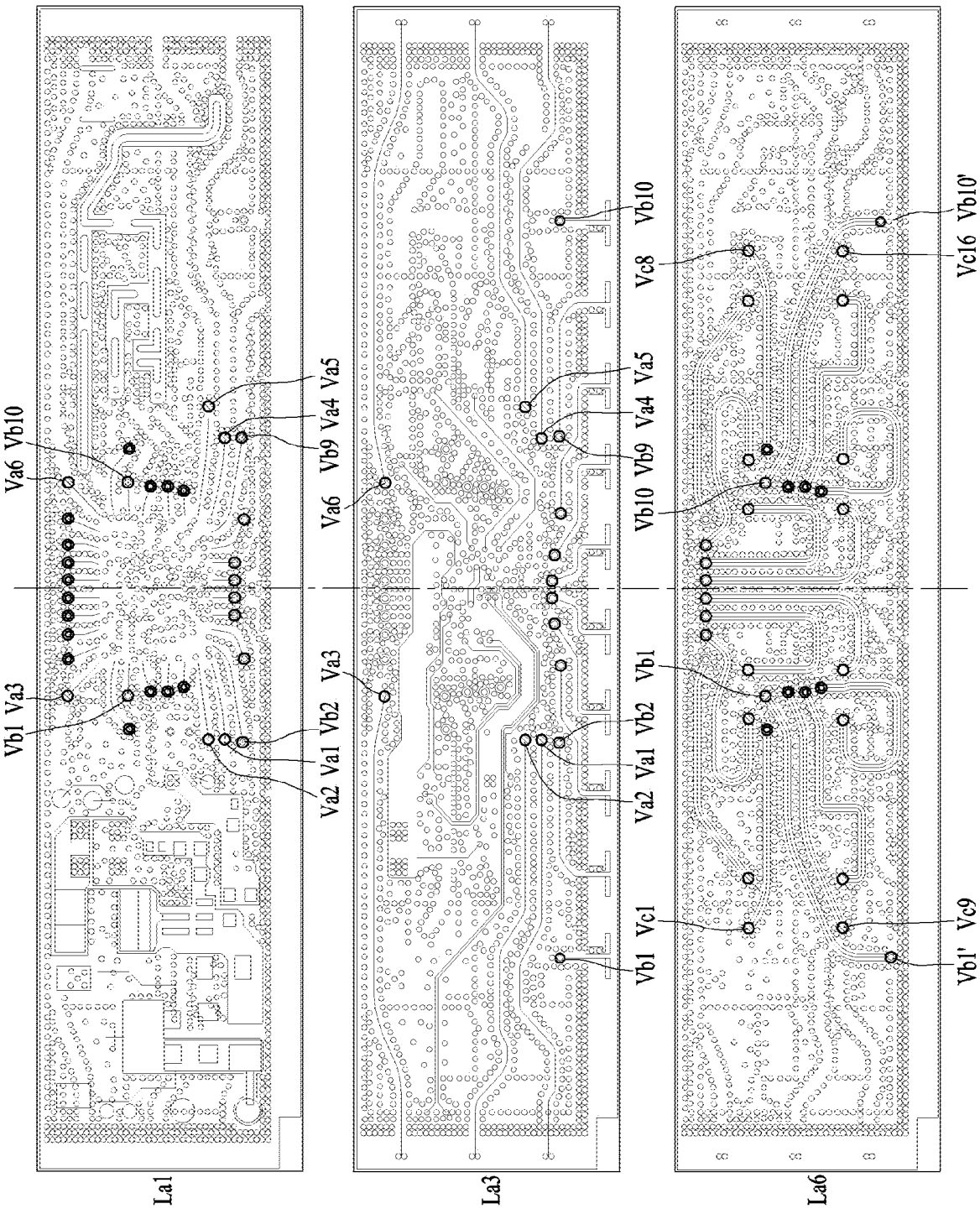
FIG. 9C shows a connection structure of feed lines of first, third, and sixth layers of FIG. 9A.

Hereinafter, a disposition structure for each layer of the antenna module according to the present disclosure will be described. In this regard, FIGS. 9A and 9B are front views illustrating the antenna module of FIG. 9 for each layer. FIG. 9C shows a connection structure of feed lines of first, third, and sixth layers of FIG. 9A.

Hereinafter, each layer of the antenna module 1000a will be described in detail with reference to FIGS. 6 to 9C. The antenna module 1000a may be configured by stacking layers from a first layer La1, on which the transceiver circuitry 1400 is disposed, to a sixth layer La6, on which feed lines for the first array antenna 1200a are located. In addition, the antenna module 1000a may further include layers from a seventh layer La7, which is a ground layer for the sixth layer La6, to a twelfth layer La12, on which antenna elements of the first array antenna 1200a are disposed.

The transceiver circuitry 1400 is disposed on the first layer La1. The transceiver circuitry 1400 has a plurality of pins, and connection lines are connected to the plurality of pins. The transceiver circuitry 1400 may be disposed based on a center line of the first layer La1 in one axial direction.

The second layer La2 may include a metal layer on the central region CR, so as to be configured as a first ground layer GND1 for the first layer La1. The monopole antennas MA1 to MA6 of the third and fourth array antennas 1100a and 1100b may be disposed on one side area and another side area of the third layer La3. End portions of first feed lines of the monopole antennas MA1 to MA6 may be connected to lines of the first layer La1 by first type vias Va1 to Va6.

The dipole antennas DA1 to DA10 of the second array antenna 1300a may be disposed in a bottom area of the third layer La3. End portions of second feed lines of the dipole antennas DA2 to DA9 may be connected to lines of the first layer La1 through second type vias Vb2 to Vb9.

The fourth layer La4 may include a metal layer on the central region CR, so as to be configured as a second ground layer GND2 for the third layer La3. The first and second feed lines of the third layer La3 are disposed between the first ground layer of the second layer La2 and the second ground layer of the fourth layer La4. Accordingly, the first and second feed lines of the third layer La3 constitute a first coplanar waveguide structure in which ground layers are disposed on an upper layer and a lower layer in a heightwise direction. The metal layers of the first and second ground layers may be partially removed so that the first and second type vias can be vertically connected.

The fifth layer La5 may include a metal layer on the central region CR, so as to be configured as a third ground layer GND3 for the sixth layer La6. On the sixth layer La6, third feed lines for the patch antennas PA11 to PA18 and PA21 to PA28 of the first array antenna 1200a may be disposed. Distances between one end portion and another end portion of the third feed lines may be the same. The third feed lines may be connected to the lines of the first layer La1 by third type vias Vc1 to Vc8 and Vc9 to Vc16 that are formed on the one end portions of the third feed lines.

The outermost dipole antennas DA1 and DA10 of the third layer La3 may be connected through fourth feed lines of the sixth layer La6. Accordingly, the lines of the first layer La1 may be connected to the fourth feed lines of the sixth layer La6 through the second type vias Vb1 and Vb10. The fourth feed lines of the sixth layer La6 may be connected to the dipole antennas DA1 and DA10 of the third layer La3 by second type vias Vb1' and Vb10' at their another end portions.

The seventh layer La7 may include a metal layer on the central region CR, so as to be configured as a fourth ground layer GND4 for the sixth layer La6. The third and fourth feed lines of the sixth layer La6 are disposed between the third ground layer of the fifth layer La5 and the fourth ground layer of the fifth layer La5. Accordingly, the third and fourth feed lines of the sixth layer La6 constitute a first coplanar waveguide structure in which ground layers are disposed on an upper layer and a lower layer in a heightwise direction. The metal layers of the third and fourth ground layers may be partially removed so that the second and third type vias can be vertically connected.

As described above, the second, fourth, fifth, and seventh layers La2, La4, La5, and La7 may configure the first to fourth ground layers GND1 to GND4, respectively. The substrate 1010a may include the first ground layer GND1 for the transceiver circuitry 1400a to the fourth ground layer GND4 for the first array antenna 1200a. The third and fourth array antennas 1100a and 1100b may vertically extend from a layer between the first ground layer GND1 and the second ground layer GND2 to the upper layer of the fourth ground layer GND4.

The first array antenna 1200a may be disposed on the upper layer of the fourth ground layer GND4. The second array antenna 1300a may be disposed on a layer between the first ground layer GND1 and the second ground layer GND2. Accordingly, even if the same horizontal polarization is implemented through the first and second array antennas 1200a and 1300a, mutual interference hardly occurs due to the second to fourth ground layers GND2 to GND4.

In the RFIC 1400a, a length of a feed pattern of the first array antenna 1200a may be configured to be the same for all antenna elements. The length of the feed pattern of the first array antenna 1200a may be determined as the sum of a first length L1a to a fourth length L4a. The length of the feed pattern may be configured to be the same for all the patch antennas PA11 to PA18 and PA21 to PA28 of the third array antenna 1200. First length L1a to the fourth length L4a may be configured to be the same for all the patch antennas PA11 to PA18 and PA21 to PA28. Accordingly, signals applied from the RFIC 1400a to all of the patch antennas PA11 to PA18 and PA21 to PA28 are in phase, and a beam can be formed toward the center point in the front direction.

First and second via pads VP1 and VP2 may be formed in eighth and ninth layers La8 to La9 to vertically connect the third type vias Vc1 to Vc8 and Vc9 to Vc16. Conductive plates CP11 to CP18 and CP21 to CP28 connected to ends of the third type vias Vc1 to Vc8 and Vc9 to Vc16 may be disposed on a tenth layer La10. The conductive plates CP11 to CP18 and CP21 to CP28 may be referred to as feeding plates. A first gap G1 between the adjacent conductive plates CP11 and CP12 may be shorter than a second gap G2 between the adjacent conductive plates CP12 and CP13.

A metal layer forming a ground wall GW may be partially disposed on the eleventh layer La11. The conductive plates of the monopole antennas MA1 to MA6 configuring the third and fourth array antennas 1100a and 1100b may be disposed on one side area and another side area of the third layer La3 to the eleventh layer La11.

On the twelfth layer La12, the patch antennas PA11 to PA18 and PA21 to PA28 of the second array antenna 1300a may be disposed. Centers of the patch antennas PA11 to PA18 and PA21 to PA28 may be offset in another axis direction from the conductive plates CP11 to CP18 and CP21 to CP28. A third gap G3 between the adjacent patch antennas PA11 and PA12 may be formed to be longer than the first gap G1 and shorter than the second gap G2.

Figure 10A:
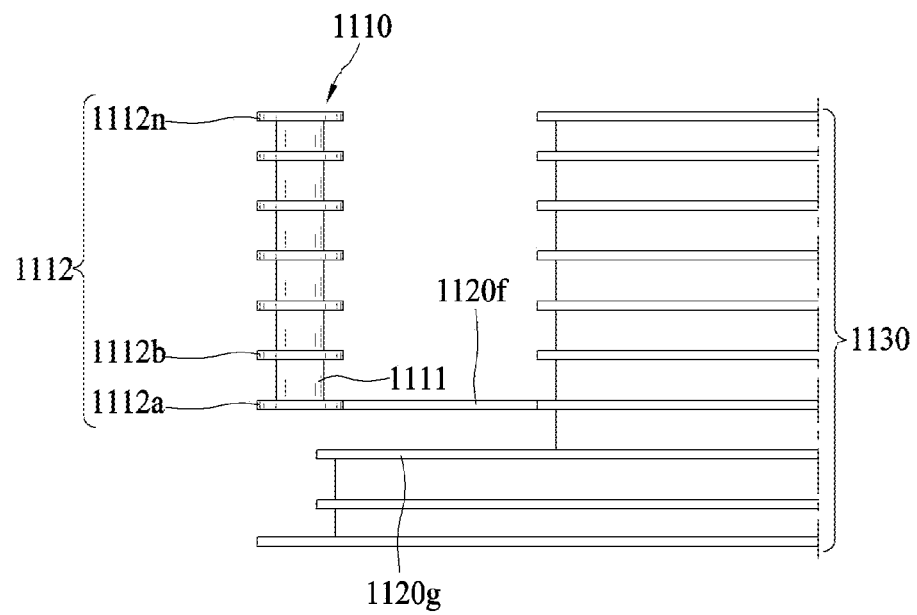
FIGS. 10A and 10B are sectional and side views of a monopole antenna according to the present disclosure.
Figure 10B:
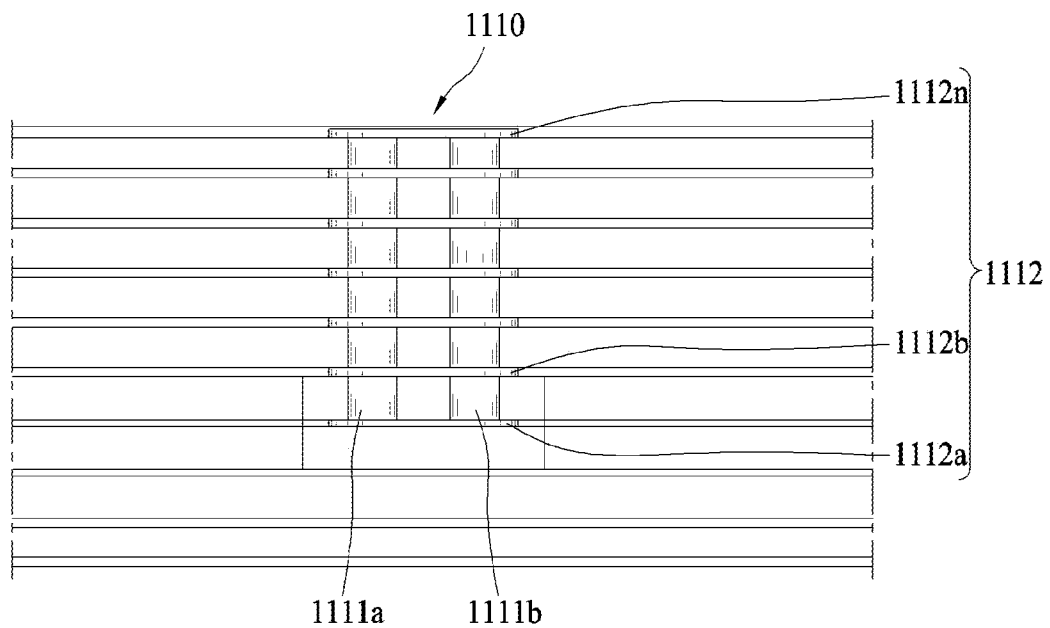
Figure 11:
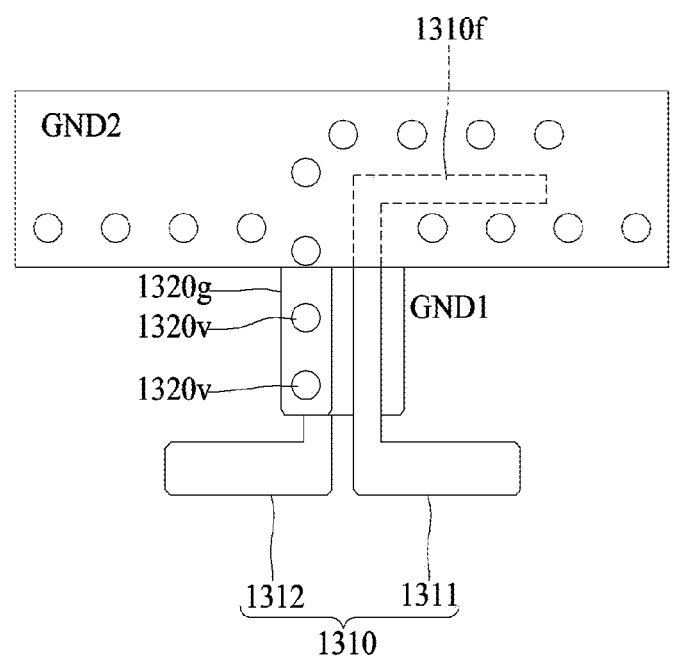
FIG. 11 is a front view illustrating a dipole antenna according to the present disclosure.

Hereinafter, monopole antennas and dipole antennas constituting an array antenna according to the present disclosure will be described in detail. In this regard, FIGS. 10A and 10B are sectional and side views of a monopole antenna according to the present disclosure. FIG. 11 is a front view illustrating a dipole antenna according to the present disclosure.

Referring to FIGS. 10A and 10B, a monopole antenna 1110 includes via pads 1112 disposed in a plurality of layers and vias 1111 connecting the via pads 1112. The vias 1111 may include first vias 1111a and second vias 1111b disposed parallel to the first vias 1111a in a lateral direction.

The via pads 1112 may include via pads 1112a to 1112n disposed on n different layers. Referring to FIGS. 7 to 10B, via pads may be connected to 9 layers of the third layer La3 to the 11th layer La11 by 8 vias, but may not be limited thereto, and may vary depending on applications. First and second vias 1111a and 1111b and the via pads 1112 are structurally configured to have inductance and capacitance. Therefore, an antenna operating frequency is lowered and a bandwidth is widened by an LC tank structure, so that the antenna can be miniaturized.

The antenna module 1000a may further include a via wall structure 1130 spaced apart from the monopole antenna 1110 by a predetermined distance in an inward direction of the substrate 1010a. The via wall structure 1130 may be disposed to include a plurality of vertical vias by which a plurality of pads are vertically connected to one another at a plurality of points. The via wall structure 1130 may be configured as a ground via wall electrically connected to the ground of the multi-layer substrate 1010a. The via wall structure 1130 may configure a ground structure and operate as a reflector for signals radiated from the monopole antenna 1110. According to another embodiment, the via wall structure 1130 may be configured as a floating via wall that is not electrically connected to the ground of the substrate 1010a.

A feed line 1120f connected to the monopole antenna 1110 is configured to feed a signal to the monopole antenna 1110. A ground layer 1120g may be disposed on a lower layer of the feed line 1120f. Accordingly, the feed line 1120f may be formed in a microstrip line structure. As another example, a ground layer may be further disposed on an upper layer of the feed line 1120f to constitute a strip line structure (or a coplanar waveguide structure).

Referring to FIG. 11, a feed pattern 1310f feeding the dipole antenna 1310 may be disposed between the first ground layer GND1 and the second ground layer GND2. The first ground layer GND1 and the second ground layer GND2 may be connected by a plurality of vias.

The dipole antenna 1310 may include a first conductive pattern 1311 and a second conductive pattern 1312. The first conductive pattern 1311 may be connected to the inner feed pattern 1310f without being connected to ground patterns. The second conductive pattern 1312 may be connected to the first ground layer GND1 through a via 1320v. The second conductive pattern 1212 may be connected to the ground pattern 1320g of the second ground layer GND2 through the via 1320v. The via 1310v may pass through the plurality of layers to connect the first ground layer GND1, the first conductive pattern 1211, and the second ground layer GND2.

The feed pattern 1310f may have a strip line structure (or a coplanar waveguide structure) by disposing the first and second ground layers GND1 and GND2 on the upper and lower layers. Referring to FIGS. 9A and 11, the dipole antenna 1310 may be disposed on the third layer La3. The first ground layer GND1 may correspond to the first ground layer of the second layer La2. The second ground layer GND2 may correspond to the second ground layer of the fourth layer La4.

Referring to FIGS. 6, 10A, and 10B, the monopole antenna 1110 may form a radiation pattern in the lateral direction of the substrate 1010a so as to transmit and receive signals in the lateral direction of the substrate 1010a. Meanwhile, referring to FIGS. 6 and 11, the dipole antenna 1310 may form a radiation pattern in a downward direction of the substrate 1010a so as to transmit and receive signals in the downward direction of the substrate 1010a.

Figure 12:
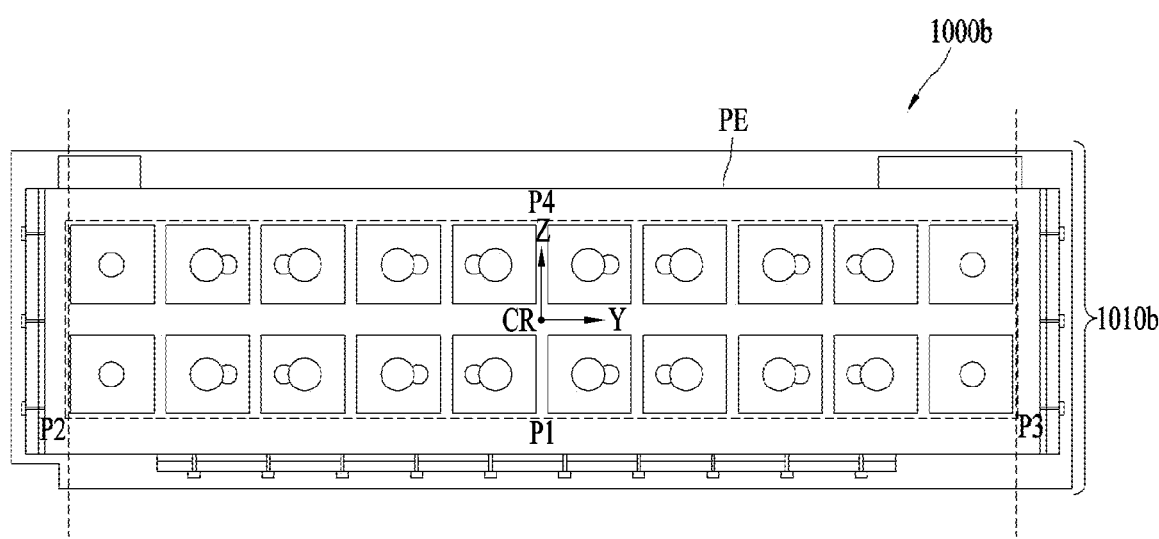
FIGS. 12 and 13 are front and sectional views illustrating a substrate having an antenna module that may be disposed on another side of an electronic device.
Figure 12:
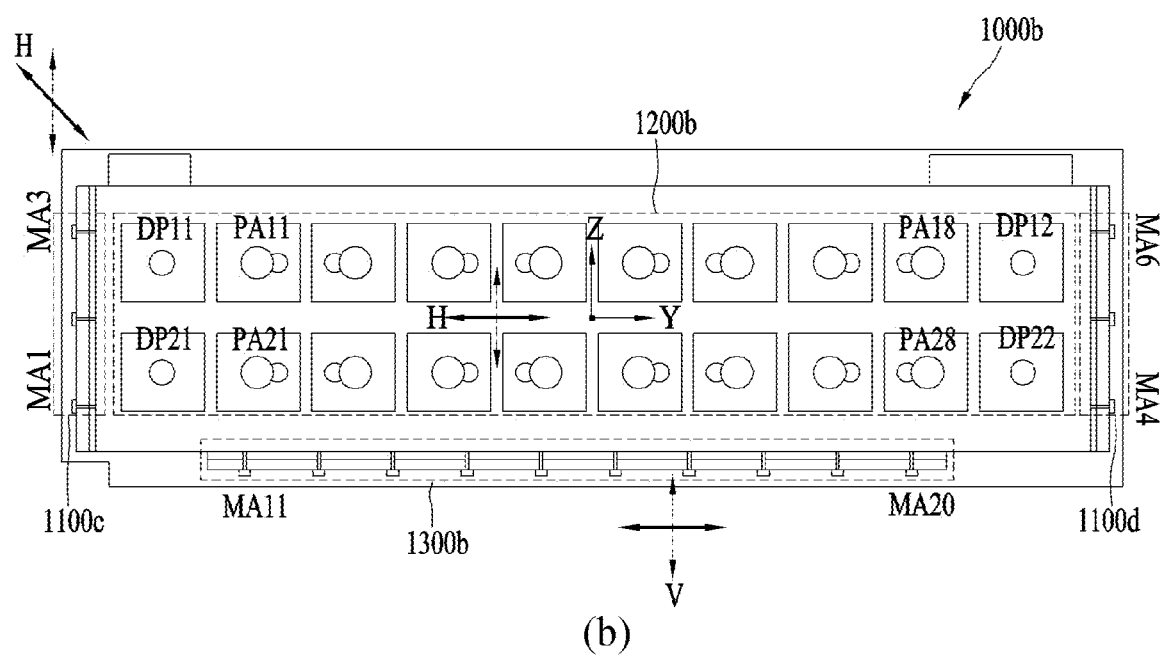
Figure 13:
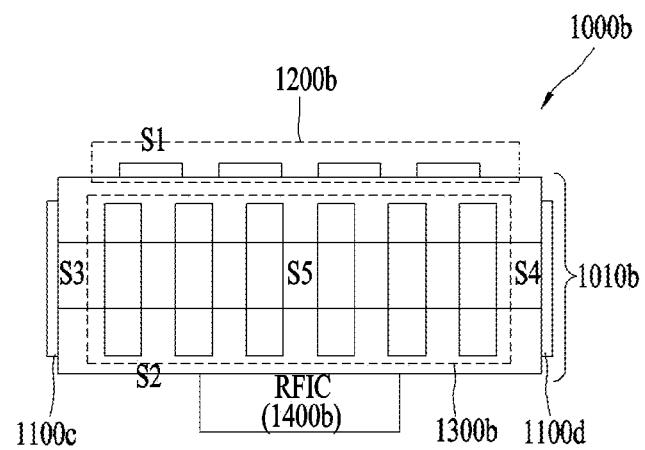
Figure 13:
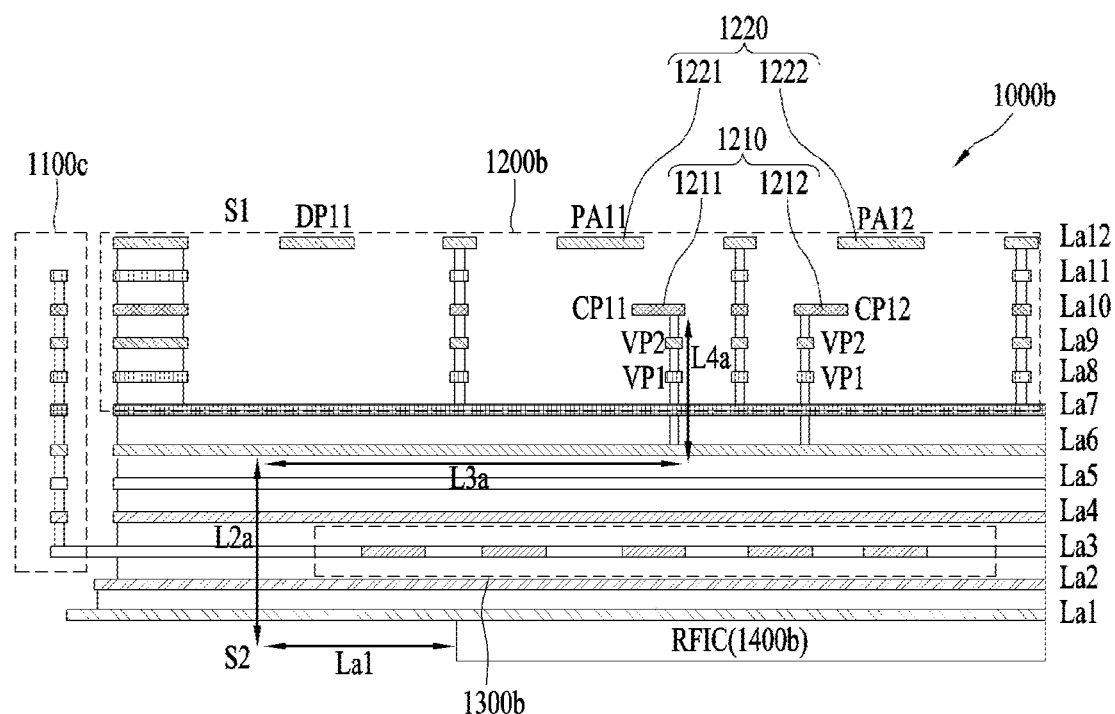
Figure 14:
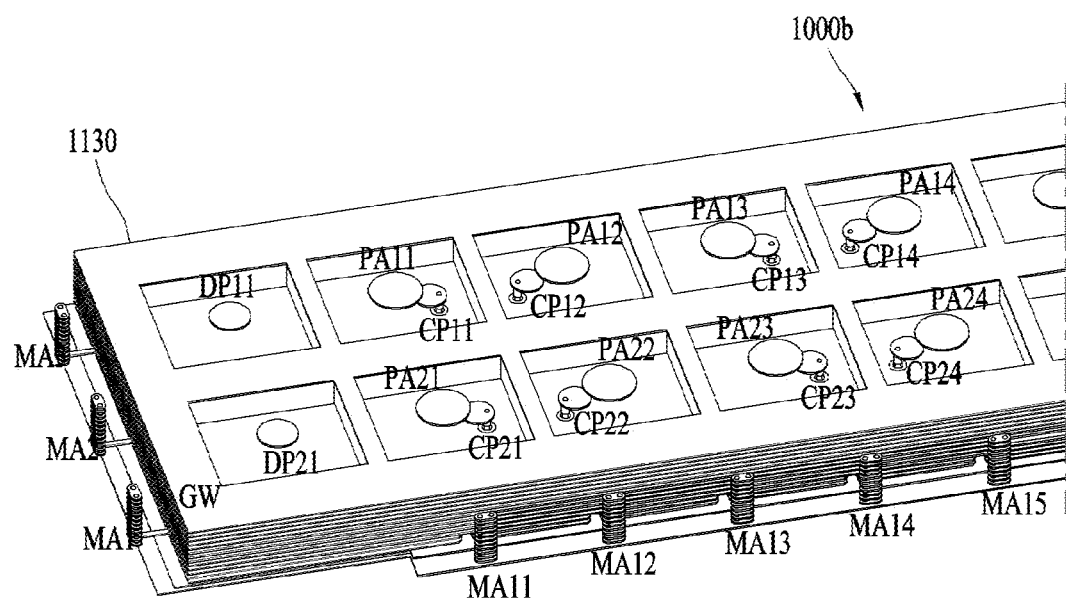
FIG. 14 shows a perspective view of the antenna module of FIG. 12 and an enlarged view of a partial area.
Figure 14:
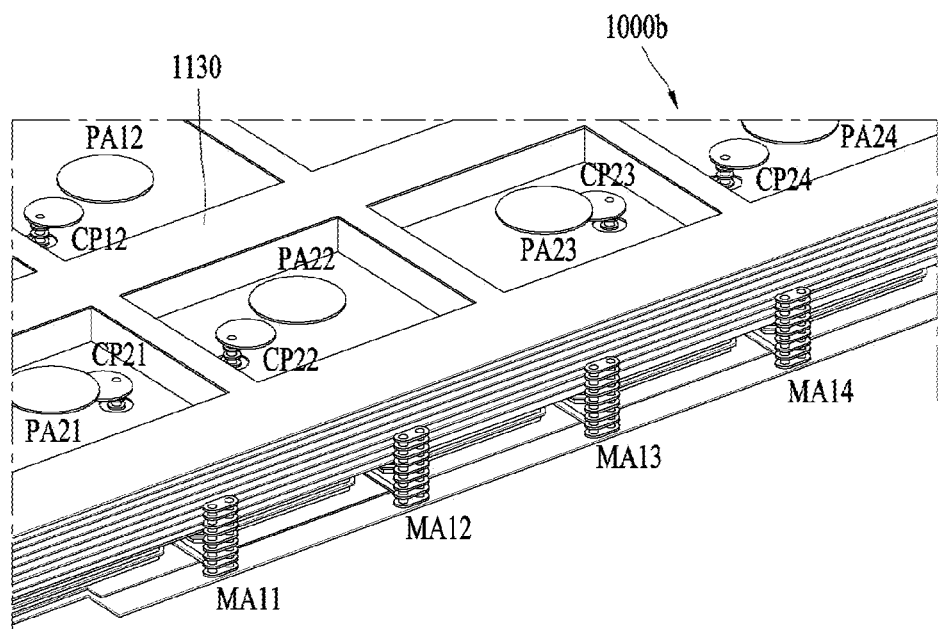

Meanwhile, at least one of the plurality of array antennas of the antenna module that may be disposed in the another side area of the electronic device according to the present disclosure may be implemented as a vertically polarized antenna. In this regard, FIGS. 12 and 13 are front and sectional views illustrating a substrate having an antenna module that may be disposed on another side of an electronic device. FIG. 14 shows a perspective view of the antenna module of FIG. 12 and an enlarged view of a partial area.

(a) of FIG. 12 shows a substrate with an antenna module 1000b for each area. A substrate 1010b may include a central region CR and a periphery PE surrounding the central region CR. The periphery PE of the substrate 1010b may include a first part P1 to a fourth part P4. The first part P1 constitutes a bottom area of the substrate 1010b, and the second part P2 constitutes one side area of the substrate 1010b. The third part P3 constitutes another side area of the substrate 1010b, and the fourth part P4 constitutes a top area of the substrate 1010b.

Referring to FIGS. 5 and 12, the antenna module 1000b may include a substrate 1010b, a first array antenna 1200b, a second array antenna 1300b, a third array antenna 1100c, and a fourth array antenna 1100d. Since the third and fourth array antennas 1100c and 1100d are disposed on the one side area and the another side area of the substrate 1010b, they may be referred to as first and second side array antennas.

(a) of FIG. 13 is a sectional view of the antenna module 1000b, and (b) of FIG. 13 is a sectional view of the substrate 1010b shown for each layer. (a) of FIG. 14 shows a perspective view of one side area based on the center of the antenna module 1000b. (b) of FIG. 14 is an enlarged view illustrating an area where some of dipole antennas MA11 to MA14 constituting the second array antenna 1300b of the antenna module are disposed.

The first array antenna 1200b may further include dummy pads DP11 to DP22 disposed on one side and another side of the patch antennas PA11 to PA28. Among the dummy pads DP11 to DP22, the first dummy pad DP11 is disposed between the first patch antenna PA11 in a first row and the second part P2. The second dummy pad DP12 is disposed between the second patch antenna PA12 in the first row and the second part P2. Among the dummy pads DP11 to DP22, the third dummy pad DP21 is disposed between the first patch antenna PA21 in a second row and the third part P3. The fourth dummy pad DP22 is disposed between the second patch antenna PA22 in the second row and the third part P3.

The ground wall (GW) 1130 may be formed to surround the dummy pads DP11 to DP22. First patch elements 1210 of the plurality of patch antennas PA11 to PA28 may be connected to feed lines, respectively. The dummy pads DP11 to DP22 are not connected to the feed lines. Second patch elements 1220 of the plurality of patch antennas PA11 to PA28 are not connected to the feed lines.

A distance between the ground wall (GW) 1130 and the dummy pads DP11 to DP22, respective sizes thereof, and the like may be implemented within a predetermined range based on a half wavelength of an operating frequency of 60 GHz. Layer positions and sizes of conductive plates CP11 to CP28 corresponding to coupling pads and overlap regions with the patch antennas PA11 to PA28 may be designed in consideration of radiation characteristics and disposition characteristics.

Referring to FIGS. 12 to 14, the antenna module 1000b may further include a millimeter wave transceiver circuitry 1400b.

The substrate 1010b may include a first surface S1, a second surface S2, a periphery PE, and a central region CR. The periphery PE may be formed between the first surface S1 and the second surface S2. The first surface S1 may be opposite to the second surface S2. The substrate 1010b may be implemented as a multi-layer substrate. For example, the substrate 1010b may be implemented as a 12-layer substrate, but is not limited thereto, and may vary depending on applications. The first surface S1 of the substrate 1010b may correspond to a surface of a twelfth layer La12.

The substrate 1010a may have a plurality of side surfaces. Among the plurality of side surfaces, the first surface S1 may be disposed to face a front direction of the antenna module 1000a, and the second surface S2 may be disposed to face a rear direction of the antenna module 1000a. Among the plurality of side surfaces, the third and fourth surfaces S3 and S4 may be disposed to face left and right directions, respectively. Among the plurality of side surfaces, a fifth surface S5 may be configured to face a bottom direction of the antenna module.

The third array antenna 1100c and the fourth array antenna 1100d may be disposed on the second part P2 and the third part P3 of the periphery PE of the substrate 1010b. The third array antenna 1100c and the fourth array antenna 1100d may form beam patterns to side areas of the electronic device. The third array antenna 1100c and the fourth array antenna 1100d may radiate horizontally polarized signals to side areas of the electronic device.

The third array antenna 1100c may include a plurality of first monopole antennas MA1 to MA3 disposed on the second part P2 of the periphery PE of the substrate 1010b. The fourth array antenna 1100d may include a plurality of first monopole antennas MA4 to MA6 disposed on the third part P3 of the periphery PE of the substrate 1010*b*. The third array antenna 1100*c* and the fourth array antenna 1100*d* may be implemented with three antenna elements, respectively, on one side and another side of the periphery PE of the substrate 1010*b*. The third array antenna 1100*c* may be implemented as a 1×3 array antenna on one side of the substrate 1010*b*, but is not limited thereto. The fourth array antenna 1100*d* may be implemented as a 1×3 array antenna on another side of the substrate 1010*b*, but is not limited thereto.

The first array antenna 1200*b* may be disposed on the first surface S1 of the substrate 1010*b*. The first array antenna 1200*b* may form a beam pattern toward the front area of the electronic device. The first array antenna 1200*b* may radiate a horizontally polarized signal to the front area of the electronic device. The first array antenna 1200*b* may be implemented as 16 antenna elements on the central region CR of the substrate 1010*b*.

The first array antenna 1200*b* may include a plurality of patch antennas PA11 to PA18 and PA21 to PA28 disposed on the first surface S1 of the substrate 1010*b*. Dummy pads DP11 and DP21 may be disposed on one side of the patch antennas PA11 and P21 to suppress side surface radiation. The dummy patch antennas DP11 and DP21 may be disposed on another side of the patch antennas PA11 and P21 to suppress side surface radiation. The second array antenna 1300*b* may be implemented as 16 2×8 array antennas on the center region CR of the substrate 1010*b*, but is not limited thereto.

Each patch antenna of the first array antenna 1200*b* may include first patch elements 1210 and second patch elements 1220. The second patch elements 1220 may be stacked in a direction perpendicular to the first patch elements 1210 such that signals of the first patch elements 1210 are coupled. The center of the second patch element 1220 may be offset from the center of the first patch element 1210 in one axial direction. The center of the second patch element 1220 may be disposed in another axial direction perpendicular to the one axial direction with respect to the center of the first patch element 1210.

A second gap between adjacent second patch elements 1221 and 1222 may be larger than a first gap between adjacent first patch elements 1211 and 1212. To this end, the second patch element 1221 in a first column may be disposed to be offset in the left direction with respect to the first patch element 1211 in the first column. Meanwhile, the second patch element 1222 in a second column may be disposed to be offset in the right direction with respect to the first patch element 1212 in the second column. A current flow direction of a signal applied to the first patch element 1211 in the first column is the left direction, and a current flow direction of a signal applied to the first patch element 1212 in the second column is the right direction. The current flow directions of the signals applied to the first patch elements 1211 and 1212 in the first and second columns are opposite to each other. Accordingly, a phase difference of the signals applied to the first patch elements 1211 and 1212 in the first and second columns is supposed to be 180 degrees so that the current flow directions can be the same. To this end, the RFIC 1400*b* may control a phase shifter such that the phase difference between the signals applied to the first patch elements 1211 and 1212 in the first and second columns is 180 degrees.

The second array antenna 1300*b* may be disposed on the first part P1 of the periphery PE of the substrate 1010*b*. The second array antenna 1300*b* may form a beam pattern toward the bottom area of the electronic device. The second array antenna 1300*b* may radiate a vertically polarized signal to the bottom area of the electronic device.

The second array antenna 1300*b* may include the plurality of second monopole antennas MA11 to MA20 disposed on the first part P1 of the periphery PE of the substrate 1010*b*. The second array antenna 1300*b* may be implemented with 10 antenna elements on the bottom side of the periphery PE of the substrate 1010*b*. The second array antenna 1300*b* may be implemented with 10 1×10 array antennas on the bottom side of the periphery PE of the substrate 1010*b*, but is not limited thereto.

The millimeter wave transceiver circuitry 1400*b* may be disposed on the second surface S2. The millimeter wave transceiver circuitry 1400*b* may be configured to transmit and receive signals at frequencies between 10 GHz and 400 GHz using at least one of the first array antenna 1200*b*, the second array antenna 1300*b*, and the third and fourth array antennas 1100*c* and 1100*d*. The millimeter wave transceiver circuitry 1400 may be configured to transmit and receive signals at frequencies between 10 GHz and 400 GHz using at least one of the plurality of first monopole antennas MA1 to MA6, the plurality of patch antennas PA11 to PA18 and PA21 to PA28, and the plurality of second monopole antennas MA11 to MA20. The millimeter wave transceiver circuitry 1400*b* may be referred to as a radio frequency integrated chip (RFIC).

The number of elements of the first array antenna 1200*b* forming the beam pattern toward the front area may be set to be greater than the number of elements of the second array antenna 1300*b* forming the beam pattern toward the bottom area. The number of elements of the second array antenna 1300*b* forming the beam pattern toward the bottom area may be set to be greater than the number of elements of the third and fourth array antennas 1100*c* and 1100*d* forming the beam pattern toward the side areas.

In this regard, 16 pins among 32 pins of the RFIC 1400*b* may be connected to the first array antenna 1200*b* forming the beam pattern toward the front area. Ten pins of the 32 pins of the RFIC 1400*b* may be connected to the second array antenna 1300*b* forming the beam pattern toward the bottom area. 6 pins of the 32 pins of the RFIC 1400*b* may be connected to the third and fourth array antennas 1100*c* and 1100*d* forming the beam pattern toward the side areas.

In this regard, the first array antenna 1200*b* has the largest number of elements, so it can transmit signals over a long distance to the front area of the electronic device, but has a narrow beam coverage. The narrow beam coverage can be supplemented by changing a beamforming direction to a horizontal direction of the front area. Accordingly, the number of elements of the first array antenna 1200*b* may be plural in the one axis direction and two in the another axis direction. For example, the first array antenna 1200*b* may be implemented as 2×8 array antennas. A beam may be formed upward by a predetermined angle from the front direction through a phase difference between signals applied between the antenna elements in the first row and the antenna elements in the second row.

The electronic device needs to perform AV wireless communication with another electronic device disposed in a bottom area of the electronic device. For the AV wireless communication, beamforming may be implemented in units of narrow beam coverage in a horizontal direction, which is the one axial direction, in the bottom area of the electronic device. Meanwhile, it is not necessary to transmit a signal to a bottom area of the electronic device over a long distance. Accordingly, the number of elements of the second array antenna 1300*b* may be plural in the one axial direction and one in the another axial direction. For example, the second array antenna 1300*b* may be implemented as 1×8, 1×10, or 1×12 array antennas.

Signals may be transferred to the side areas of the electronic device in an indoor radio environment where the electronic device is disposed. It is more important to implement a wide beam coverage for the side areas of the electronic device even without beamforming, than to implement a signal transmission over a long distance. In this regard, since the number of elements of the third and fourth array antennas 1100*c* and 1100*d* is the smallest, a wide beam coverage to the side areas of the electronic device can be achieved. Accordingly, the number of elements of the third and fourth array antennas 1100*c* and 1100*d* may be plural in the one axial direction and one in the another axial direction. For example, the third and fourth array antennas 1100*c* and 1100*d* may be implemented as 1×3 array antennas on one side and another side.

In the above, an electronic device having an antenna module has been described. The technical effects of the electronic device having the antenna module according to the present disclosure are as follows.

An electronic device according to an embodiment of the present disclosure may perform wireless communication of A/V data regardless of the location of an A/V transmitting device through first and second antenna structures in which a plurality of array antennas are disposed.

Furthermore, the A/V transmitting device may transmit two streams of data, thereby minimizing video quality deterioration that occurs when increasing a data compression rate.

In addition, since a horizontally polarized antenna and a vertically polarized antenna can be disposed together on one substrate, thereby allowing an antenna module to be compact and providing a high data reception rate.

Moreover, horizontally and vertically polarized signals may be used according to an array antenna disposition structure of the A/V transmitting device and the electronic device, thereby performing A/V wireless communication with reduced mutual interference while increasing a communication capacity.

Besides, horizontally and vertically polarized signals may be used in consideration of the location of the A/V transmitting device and electronic device and the polarization characteristics of the array antennas, thereby performing A/V wireless communication with reduced mutual interference while increasing a communication capacity.

In addition, even when an obstacle is disposed on a wireless communication path between the A/V transmitting device and the electronic device, a beamforming direction may be changed and reflected waves may be used, thereby providing seamless A/V wireless communication.

Also, the number of array antennas disposed in a front area of the antenna module of the A/V transmitting device may be greater than the number of antennas in a side area or bottom area. Accordingly, signals can be transmitted over a longer distance in the front area of the antenna module than in the side area or bottom area. Also, an antenna module that has two-dimensional array antennas and is capable of transmitting signals even upward through beamforming can be implemented.

Also, the number of array antennas disposed in side areas of the antenna module of the A/V transmitting device may be greater than the number of antennas in other areas. Accordingly, an antenna module capable of achieving a wider beam coverage in the side areas than that in a front or bottom area can be implemented.

Further scope of applicability of the present disclosure will become apparent from the following detailed description. It should be understood, however, that the detailed description and specific examples, such as the preferred implementation of the present disclosure, are given by way of illustration only, since various modifications and alternations within the spirit and scope of the disclosure will be apparent to those skilled in the art. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna module comprising:
    a substrate having a first surface, a second surface, and a periphery between the first and second surfaces, wherein the substrate defines a plurality of side surfaces and configured such that the first surface of the plurality of side surfaces faces a front side of the antenna module, the second surface faces a rear side of the antenna module, a third surface and a fourth surface of the plurality of side surfaces face left and right sides of the antenna module, and a fifth surface of the plurality of side surfaces faces a bottom side of the antenna module;
    a first array antenna disposed on the first surface of the substrate and forming a beam pattern toward a front area;
    a second array antenna disposed on a first part of the periphery of the substrate and forming a beam pattern toward a bottom area;
    third and fourth array antennas disposed on second and third parts of the periphery of the substrate and forming beam patterns toward side areas; and
    a millimeter wave transceiver circuitry disposed on the second surface and configured to transmit and receive signals at frequencies between 10 GHz and 400 GHz using at least one of the first to fourth array antennas,
    wherein a number of elements of the first array antenna forming the beam pattern toward the front area is greater than a number of elements of the second array antenna forming the beam pattern toward the bottom area, and
    a number of elements of the second array antenna forming the beam pattern toward the bottom area is greater than a number of elements of the third and fourth array antennas forming the beam patterns toward the side areas.

2. The antenna module of claim 1, wherein the first array antenna is disposed on a front side of the substrate,
    the second array antenna is disposed on a bottom side of the substrate, and
    the third array antenna and the fourth array antenna are disposed on one side of the periphery of the substrate and another side opposite to the one side.

3. The antenna module of claim 1, wherein the first array antenna includes a plurality of patch antennas disposed in one axial direction,
    the second array antenna includes a plurality of dipole antennas disposed in the one axial direction,
    the third array antenna and the fourth array antenna include a plurality of monopole antennas disposed in another axis direction.

4. The antenna module of claim 3, wherein each patch antenna of the first array antenna include a first patch element, and a second patch element stacked in a direction perpendicular to the first patch element so that a signal of the first patch element is coupled,
- a center of the second patch element is offset in the one axis direction from a center of the first patch element, and
- the center of the second patch element and the center of the first patch element are aligned in the another axial direction perpendicular to the one axial direction.

5. The antenna module of claim 4, further comprising a ground wall disposed on the periphery of the substrate and having vias connecting a plurality of layers,
- wherein the ground wall is disposed between the patch antennas in the one axial direction and the another axial direction to surround the respective patch antennas.

6. The antenna module of claim 5, wherein the first array antenna further comprises dummy pads at one side and another side of the patch antennas,
- wherein a first dummy pad of the dummy pads is disposed between a first patch antenna in a first row and the second part, and a second dummy pad is disposed between a second patch antenna in the first row and the second part, and
- a third dummy pad is disposed between a first patch antenna in a second row and the third part, and a fourth dummy pad is disposed between a second patch antenna in the second row and the third part.

7. The antenna module of claim 6, wherein the ground wall is formed to surround the dummy pads,
- the first patch element of each of the plurality of patch antennas is connected to feed lines,
- the dummy pads are disposed on the same plane as the second patch element, and
- the dummy pads are not connected to the feed lines, and the second patch element is not connected to the feed lines.

8. The antenna module of claim 1, wherein the first array antenna is a horizontally polarized antenna,
- the second array antenna is a horizontal antenna,
- the first array antenna and the second array antenna are the horizontally polarized antennas,
- the first array antenna is implemented with 16 antenna elements disposed on a central region of the substrate,
- the third array antenna is implemented with 10 antenna elements on a bottom side of the periphery of the substrate, and
- the third array antenna and the fourth array antenna are implemented with three antenna elements, respectively, on one side and another side of the periphery of the substrate.

9. The antenna module of claim 1, wherein the substrate includes a first ground layer for the transceiver circuitry to a fourth ground layer for the first array antenna, and
- the third and fourth array antennas extend vertically from a layer between the first ground layer and the second ground layer to an upper layer of the fourth ground layer.

10. The antenna module of claim 9, wherein the first array antenna is disposed on the upper layer of the fourth ground layer, and
- the second array antenna is disposed on a layer between the first ground layer and the second ground layer.

* * * * *